(12) United States Patent
Radulescu et al.

(10) Patent No.: US 8,639,243 B2
(45) Date of Patent: Jan. 28, 2014

(54) SYSTEMS, METHODS AND APPARATUS CONFIGURED TO MANAGE NEIGHBOR CELL LISTS

(75) Inventors: Andrei Dragos Radulescu, San Diego, CA (US); Peter Hans Rauber, San Diego, CA (US); Sanjiv Nanda, Ramona, CA (US); Damanjit Singh, San Diego, CA (US); Jen M. Chen, San Diego, CA (US); Farhad Meshkati, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 255 days.

(21) Appl. No.: 12/860,613

(22) Filed: Aug. 20, 2010

(65) Prior Publication Data

US 2011/0207456 A1 Aug. 25, 2011

Related U.S. Application Data

(60) Provisional application No. 61/236,014, filed on Aug. 21, 2009.

(51) Int. Cl.
*H04W 4/00* (2009.01)
(52) U.S. Cl.
USPC ....... 455/434; 455/436; 455/90.3; 455/435.2; 455/446; 455/444; 455/525; 455/522; 455/418; 455/407; 455/435.1; 370/254; 370/311; 370/331; 370/328; 370/237; 370/352; 370/338; 370/329; 370/410

(58) Field of Classification Search
USPC ......... 370/338, 329, 254, 410, 331, 311, 328, 370/237, 252, 352; 455/436, 90.3, 435.2, 455/446, 444, 525, 456.1, 522, 418, 509, 455/434, 407, 435.1, 422.1
See application file for complete search history.

(56) References Cited

U.S. PATENT DOCUMENTS

| 7,013,141 B2 | 3/2006 | Lindquist et al. |
| 7,065,361 B1 | 6/2006 | Fortuna |

(Continued)

FOREIGN PATENT DOCUMENTS

| EP | 1422959 A1 | 5/2004 |
| EP | 2079263 A1 | 7/2009 |

(Continued)

OTHER PUBLICATIONS

International Search Report and Written Opinion—PCT/US2010/046379—International Search Authority, European Patent Office,Jan. 12, 2011.

(Continued)

*Primary Examiner* — Joseph Arevalo

(57) ABSTRACT

According to some wireless network standards the size of a neighbor cell list is restricted to a maximum size. The limited size of a neighbor cell list may not reflect the realities of a wireless network deployment, especially for deployments including numerous femto cells clustered in close proximity. Accordingly, as the concentration of macro cells and/or femto cells in an area increases, there lies a challenge to identify and communicate neighbor lists to user devices that reflect the arrangement of a particular portion of the deployment and the needs of the user devices. Various systems, methods and apparatus described herein are configured to provide a user device or a group of user devices a neighbor cell list that includes neighbor cell identifiers chosen from a candidate list.

89 Claims, 17 Drawing Sheets

(56) References Cited

U.S. PATENT DOCUMENTS

| | | | |
|---|---|---|---|
| 7,319,852 B2 | 1/2008 | Schlegel et al. | |
| 7,706,304 B2* | 4/2010 | Sinicrope et al. | 370/254 |
| 7,924,785 B2 | 4/2011 | Shaheen et al. | |
| 8,090,376 B2 | 1/2012 | Tolli et al. | |
| 8,107,950 B2 | 1/2012 | Amirijoo et al. | |
| 8,190,155 B2* | 5/2012 | Roy et al. | 455/435.2 |
| 2004/0002328 A1 | 1/2004 | Chandra et al. | |
| 2005/0153667 A1* | 7/2005 | Cave et al. | 455/90.3 |
| 2005/0255847 A1* | 11/2005 | Han et al. | 455/436 |
| 2006/0040700 A1 | 2/2006 | Roberts et al. | |
| 2007/0097938 A1* | 5/2007 | Nylander et al. | 370/338 |
| 2007/0218920 A1* | 9/2007 | Bolin | 455/456.1 |
| 2007/0232307 A1* | 10/2007 | Ibrahim et al. | 455/436 |
| 2008/0207207 A1 | 8/2008 | Moe et al. | |
| 2009/0003279 A1 | 1/2009 | Abusch-Magder et al. | |
| 2009/0005052 A1* | 1/2009 | Abusch-Magder et al. | 455/446 |
| 2009/0092098 A1* | 4/2009 | Kim | 370/331 |
| 2010/0056148 A1* | 3/2010 | Kellil et al. | 455/436 |
| 2010/0203891 A1 | 8/2010 | Nagaraja et al. | |
| 2010/0238871 A1* | 9/2010 | Tosic et al. | 370/329 |
| 2010/0273481 A1 | 10/2010 | Meshkati et al. | |
| 2011/0228687 A1 | 9/2011 | Catovic et al. | |
| 2013/0079003 A1 | 3/2013 | Nagaraja et al. | |
| 2013/0079007 A1 | 3/2013 | Nagaraja et al. | |

FOREIGN PATENT DOCUMENTS

| | | |
|---|---|---|
| EP | 2224770 A1 | 9/2010 |
| GB | 2331892 A | 6/1999 |
| WO | WO-2005089249 A2 | 9/2005 |
| WO | WO-2006115739 A2 | 11/2006 |
| WO | WO2008095542 A1 | 8/2008 |
| WO | WO2008113373 A1 | 9/2008 |
| WO | WO2009040764 A1 | 4/2009 |
| WO | WO2009088332 A1 | 7/2009 |
| WO | WO2010149829 A1 | 12/2010 |
| WO | WO2011160009 A2 | 12/2011 |

OTHER PUBLICATIONS

3rd Generation Partnership Project; Technical Specification Group Radio Access Network; Evolved Universal Terrestrial Access (E-UTRA) and Evolved Universal Terrestrial Radio Access Network (E-UTRAN); Overall description; Stage 2 (Release 10), 3GPP Standard; 3GPP TS 36.300, 3rd Generation Partnership Project (3GPP), Mobile Competence Centre ; 650, Route Des Lucioles ; F-06921 Sophia-Antipolis Cedex ; France, No. V10.2.0, Dec. 18, 2010 , pp. 1-200, XP050462130, [retrieved on Dec. 18, 2010].

Ericsson et al: "Method for ANR support in UTRAN", 3GPP DRAFT; R2-106442 Method for ANR Support in UTRAN, 3rd Generation Partnership Project (3GPP), Mobile Competence Centre ; 650, Route Des Lucioles ; F-06921 Sophia-Antipolis Cedex ; France, vol. RAN WG2, No. Jacksonville, USA; 20101115, Nov. 9, 2010, XP050492277, [retrieved on Nov. 9, 2010].

ETSI: "DRAFT Meeting Report for 36PP TSG SA WG5 meeting #57", 3GPP DRAFT; S5-080489_MEETINGREPORT_S5-57_2008-02-19_07H58, 3rd Generation Partnership Project (3GPP), Mobile Competence Centre ; 650, Route Des Lucioles ; F-06921 Sophia-Antipolis Cedex ; France, vol. SA WG5, No. St Julian, Malta; 20080226, Feb. 26, 2008, XP050307081, [retrieved on Feb. 26, 2008].

ETSI TS 125 331 v9.5.0; "Universal Mobile Telecommunications Systems (UMTS); Radio Resource Control (RRC)", 3GPP TS 25.331 version 9.5.0 Release 9 (Mar. 2011).

Huawei: "Alignment of SON use cases for optimization", 3GPP DRAFT; R3-080356_SON_UC_ALIGNMENT, 3rd Generation Partnership Project (3GPP), Mobile Competence Centre; 650. Route Des Lucioles ; F-06921 Sophia-Antipolis Cedex ; France, vol. RAN WG3, No. Sorrento, Italy; 20080205, Feb. 5, 2008, XP050163564, [retrieved on Feb. 5, 2008].

Huawei et al: "Discussion on UMTS ANR non-CELL DCH based approach (log approach)", 3GPP DRAFT: R2-106257 Discussion on UMTS ANR Non CELL_DCH Based Approach (Log Approach), 3rd Generation Partnership Project (3GPP), Mobile Competence Centre ; 650. Route Des Lucioles : F-06921 Sophia-Antipolis Cedex ; France, vol. RAN WG2, No. Jacksonville, USA; 20101115, Nov. 8, 2010, XP050492078, [retrieved on Nov. 8, 2010].

Huawei et al.: "Introduction of UTRAN Automatic Neighbor Relation", 3GPP DRAFT; 25.304_CRXXXX_(REL-10)_R2-110185, 3rd Generation Partnership Project (3GPP), Mobile Competence Centre ; 650, Route Des Lucioles , F-06921 Sophia-Antipolis Cedex ; France, vol. RAN WG2, No. Dublin, Ireland; 20110117, Jan. 11, 2011, XP050474244, [retrieved on Jan. 11, 2011].

Taiwan Search Report—TW099128130—TIPO—Apr. 7, 2013.

3GPP TS 44.060 v8.7.0 (Feb. 2010), Digital cellular telecommunications system (Phase 2+);.General Packet Radio Service (GPRS); Mobile Station (MS)—Base Station System (BSS) interface; Radio Link Control/Medium Access Control (RLC/MAC) protocol (Release 8), Feb. 2010, ETSI, pp. 1-587.

Wikipedia, "3GPP Long Term Evolution (LTE)," Feb 8, 2010, pp. 1-13.

Wikipedia, "Radio Network Controller (RNC)," Feb 9, 2009, pp. 1-3.

\* cited by examiner

SYSTEMS, METHODS AND APPARATUS CONFIGURED TO MANAGE NEIGHBOR CELL LISTS

CLAIM OF PRIORITY UNDER 35 U.S.C. §119

The present Application for Patent claims priority to U.S. Provisional Application No. 61/236,014, entitled "EXPANSION OF NEIGHBOR CELL LISTS IN WIRELESS SYSTEMS VIA OPTIMAL ROTATION OF LIST MEMBERS," filed Aug. 21, 2009. The above-referenced application is hereby expressly incorporated by reference herein.

BACKGROUND

1. Field

The present application relates to wireless systems, and more specifically to systems, methods and apparatus configured to manage neighbor cell lists in wireless systems.

2. Background

Wireless communication systems are widely deployed to provide various types of communication (e.g., voice, data, multimedia services, etc.) to multiple users. In addition to mobile phone networks currently in place, a new class of small base stations has emerged, which may be installed in a private or public spaces to provide wireless coverage to mobile units using broadband Internet connections. These small base stations are generally known as access point base stations, or, alternatively, Home Node B (HeNB or HNB) or femto nodes. Typically, femto nodes are connected to the Internet and the mobile operator's network via a direct subscriber line (DSL) router or a cable modem. Femto nodes may be deployed by individual users or groups within the coverage area of a conventional macro node or cell.

In order to enable user devices to transfer service from one base station or access point to another, various wireless network standards enable base stations and access points to provide deployment information to user devices. Typically the deployment information is a list of neighbor cell identifiers known as a neighbor cell list (or a neighbor list).

However, according to some wireless network standards, such as Universal Mobile Telecommunication System (UMTS) for example, the size of the neighbor list is restricted to a maximum size. That is, a base station or access point can only include a preset number of neighbor cell identifiers in the neighbor list at one time. The fixed size of a neighbor list provided by a standard may not reflect the realities of a wireless network deployment, especially for deployments including numerous femto cells clustered in close proximity. In particular, the number of macro, pico and/or femto cells in one area may exceed the maximum size of the neighbor list as specified in a standard relevant to the deployment. Accordingly, as the concentration of macro cells and/or femto cells in an area increases, there lies a challenge to identify and communicate neighbor lists to user devices that reflect the arrangement of a particular portion of the deployment and the needs of the user devices.

SUMMARY

Various embodiments of systems, methods and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various embodiments are used to manage wireless network resources at base stations, pico nodes and/or femto nodes.

One aspect of the disclosure is a method of forming a list of neighboring wireless access points. In one embodiment, the method includes: determining a candidate list, the candidate list including a plurality of neighboring wireless access points, wherein each of the plurality of neighboring wireless access points has at least one characteristic by which that particular neighboring wireless access point can be selected; and selecting at least one wireless access point from the candidate list to form a neighbor list, the neighbor list including a subset of the plurality of neighboring wireless access points included in the candidate list.

Another aspect of the disclosure is a wireless access point including: means for determining a candidate list, the candidate list including a plurality of neighboring wireless access points, wherein each of the plurality of neighboring wireless access points has at least one characteristic by which that particular neighboring wireless access point can be selected; and means for selecting at least one wireless access point from the candidate list to form a neighbor list, the neighbor list including a subset of the plurality of neighboring wireless access points included in the candidate list.

Another aspect of the disclosure is a wireless access point. In one embodiment the wireless access point includes a controller configured to execute code, and non-transitory computer readable memory storing code that is executable by the controller. When executed by the controller the code is configured to: determine a candidate list, the candidate list including a plurality of neighboring wireless access points, wherein each of the plurality of neighboring wireless access points has at least one characteristic by which that particular neighboring wireless access point can be selected; and select at least one wireless access point from the candidate list to form a neighbor list, the neighbor list including a subset of the plurality of neighboring wireless access points included in the candidate list.

Another aspect of the disclosure is a system including a controller configured to execute code, and non-transitory computer readable memory storing code. When executed by the controller the code is configured to: determine a candidate list, the candidate list including a plurality of neighboring wireless access points, wherein each of the plurality of neighboring wireless access points has at least one characteristic by which that particular neighboring wireless access point can be selected; and select at least one wireless access point from the candidate list to form a neighbor list, the neighbor list including a subset of the plurality of neighboring wireless access points included in the candidate list.

Figure 1:
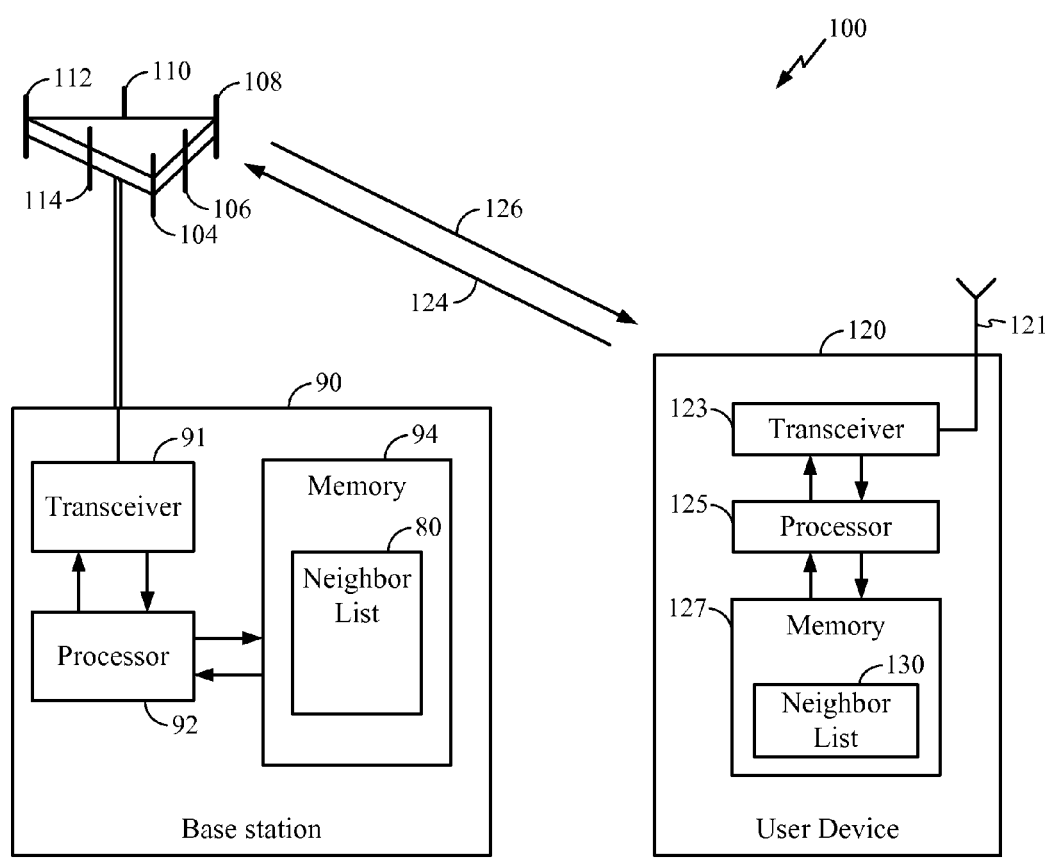
FIG. 1 is a simplified block diagram of several sample aspects of a communication system.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION OF THE PREFERRED EMBODIMENT

Various aspects of embodiments within the scope of the appended claims are described below. It should be apparent that the aspects described herein may be embodied in a wide variety of forms and that any specific structure and/or function described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). As an access terminal (AT) or user equipment (UE) moves through such a network, the access terminal may be served in certain locations by access nodes (ANs) that provide macro coverage while the access terminal may be served at other locations by access nodes that provide smaller scale coverage. In some aspects, the smaller coverage nodes may be used to provide incremental capacity growth, in-building coverage, outdoor coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

Moreover, a particular femto node or group of femto nodes may only permit access to a particular group of users, known as a closed subscriber group (CSG). Alternatively, other femto nodes, known as open access nodes, allow all users access without discrimination. There are also hybrid-femto nodes that provide access to both CSG members and non-members. However, hybrid-femto nodes discriminate between CSG members and non-members, and will terminate or deny system access to non-members when CSG members are underserviced. Moreover, in some deployments the three aforementioned distinctions also apply to pico nodes and/or macro nodes.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB (HNB), Home eNodeB (HeNB), access point base station, femto cell, and so on. Analogous terminology also applies to pico nodes.

FIG. 1 is a simplified block diagram of several sample aspects of a portion of a communication system. The system 100 includes a base station (or access point) 90 and a UE 120 (e.g. a smart phone, cell phone, computer, etc.). It should be appreciated, however, that the description herein may be applicable to other types of apparatus or other similar apparatuses that are referenced using other terminology.

Moreover, those skilled in the art will appreciate from the disclosure herein that a base station (or access point) includes a number of features not illustrated in FIG. 1, and for the sake of brevity, only a simplified set of features have been illustrated to discuss aspects of embodiments disclosed herein. To that end, the base station 90 includes, for example and without limitation, multiple antenna groups, one including 104 and 106, another including 108 and 110, and an additional including 112 and 114. In FIG. 1, only two antennas are shown for each antenna group, however, more or fewer antennas may be utilized for each antenna group. Each group of antennas and/or the area in which they are designed to communicate is often referred to as a sector of the base station 90. In the embodiment, antenna groups each are designed to communicate to UEs and/or access terminals in a sector, of the areas covered by the base station 90.

The base station 90 also includes a transceiver 91, a processor 92 and a memory 94. The transceiver 91 is coupled to the antenna groups described above. In one embodiment, the processor 92 is used to control the transceiver 91 and retrieve and/or store data in the memory 94. The memory 94 stores a neighbor list 80 that includes a list of neighbor cell identifiers. That is the neighbor list 80 includes identifiers of cells (e.g. macro, pico and/or femto) that are adjacent to and/or overlap with the cell defined by the base station 90.

Similarly, the UE 120 includes an antenna 121, a transceiver 123, a processor 125 and a memory 127. The transceiver 123 is coupled to the antenna 121. In one embodiment, the processor 125 is used to control the transceiver 123 and retrieve and/or store data in the memory 127. The memory 127 stores a copy of the neighbor list 130 received from the base station 90 or another base station (or access point).

As an example, in operation, the base station 90 is in communication with antennas 106 and 108, where antennas 106 and 108 transmit information, such as the neighbor list, to the UE 120 over forward link 126 and receive information from the UE 120 over reverse link 124.

In communication over the forward link 126, the transmitting antennas of the base station 90 may utilize beamforming in order to improve the signal-to-noise ratio of forward links for the UE 120. A base station using beamforming to transmit to UEs (or other access terminals) scattered randomly through its coverage causes less interference to access terminals in neighboring cells than an access point transmitting through a single antenna to all its access terminals.

One problem highlighted above is that according to various wireless network standards, such as UMTS, the size of the neighbor list is restricted to a maximum size. That is, a base station or access point can only include a preset number of neighbor cell identifiers in the neighbor list at one time. The fixed size of a neighbor list provided by a standard may not reflect the realities of a wireless network deployment, especially for deployments including numerous femto cells (or pico cells) clustered in close proximity to one another. In particular, the number of cells in one area may exceed the maximum size of the neighbor list as specified in a standard governing the deployment. Accordingly, as the concentration of macro cells, femto cells and/or pico cells in an area increases, there lies a challenge to identify and communicate neighbor lists to user devices that reflect the arrangement of a particular portion of the deployment and the needs of the UEs.

Moreover, while an access point may have multiple neighbor cells, a particular UE may only be able to request and receive communication access from a subset of those neighbor cells. This could occur in deployments including various neighbor cells that each operate in one of closed, open or hybrid modes of operation. For example, some of the neighbor cells may only permit access to members of a closed subscriber group and a particular UE may not be a member of that group. Alternatively, a neighbor cell may not have capacity to provide service to a particular UE.

Additionally, a particular subset of neighbor cells may be better suited to provide service to a particular UE. For example, a mobile UE that is travelling relatively quickly may be better served by neighbor cell that is a macro cell that provides service across a greater area than a femto cell in close proximity to the UE at the moment, thus reducing the need for multiple hand-offs between neighbor cells as the UE travels across a particular area.

Various systems, methods and apparatus described herein are configured to provide a UE or a group of UEs a neighbor cell list that includes neighbor cell identifiers chosen from a candidate list. In one embodiment, neighbor cell identifiers are chosen as an estimate of those neighbor cells that may better suit the needs of a particular UE or a particular group of UEs. In another embodiment, neighbor cell identifiers are chosen as an estimate of those neighbor cells that are closest to a UE or group of UEs. In another embodiment, neighbor cell identifiers are chosen as an estimate of those neighbor cells that are likely to have the capacity to provide service to a particular UE or group of UEs. In another embodiment, neighbor cell identifiers are chosen as an estimate of those neighbor cells that are considered relatively more important in the deployment. Those skilled in the art will also appreciate from the present disclosure that neighbor cell identifiers can be chosen for a neighbor list based on various criteria which are too numerous to list exhaustively herein.

The neighbor cell identifiers chosen for a particular list can be chosen based on at least one characteristic of each neighbor cell, without such a characteristic being common to all neighbor cells on a candidate list. For example, such characteristics include, without limitation, a measure of the position of a wireless access point in the candidate list, a measure of the type of cell provided by the wireless access point, a measure of the size of the cell provided by the wireless access point, a measure of the frequency of handoffs to a particular wireless access point, an estimate of the probability that a wireless access point is available as a neighbor, an estimate of the relative importance of a wireless access point, and a measure of the relative geographic position of a wireless access point. Additionally and/or alternatively, such characteristics also include, without limitation, a measure of the speed of a user device, a measure of the trajectory of a user device, a measure of the present location of a user device, an indicator identifying an antenna or antenna group currently being used to service a user device, an indicator of proximity of the user device to one or more wireless access points, and reporting by a user device.

Figure 2:
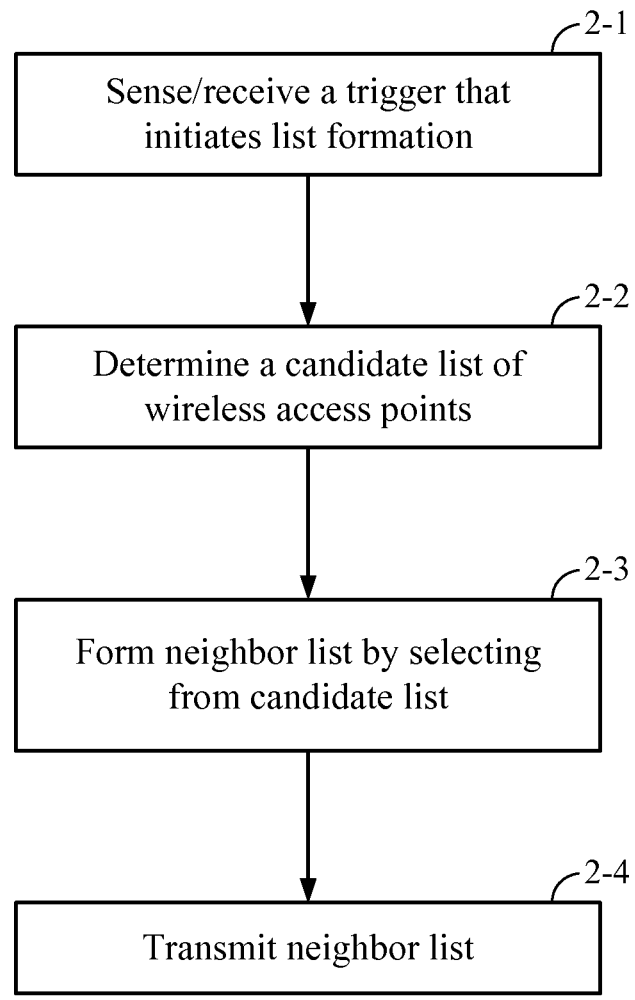
FIG. 2 is a flowchart illustrating a first method of forming a neighbor cell list.

FIG. 2 is a flowchart illustrating a first method of forming a neighbor cell list. In one example, the method is performed by the access point currently servicing a particular UE. In another example, the method is performed by another network node or even the core network at the request of the access point currently servicing a particular UE. As represented by block 2-1, the method includes sensing and/or receiving a trigger that initiates the formation and subsequent transmission of a neighbor list to one or more UEs. Examples of various types of triggers are discussed below with reference to FIGS. 3 and 7. As represented by block 2-2, the method includes determining a candidate list of wireless access points, including any combination of macro, pico, and femto nodes, in relatively close proximity to a particular access point that is either forming the neighbor list or requesting formation of the neighbor list. In one embodiment an access point forms a neighbor list according to a method described herein. In another embodiment, an access point requests another network element to form a neighbor list that the access point can then provide to one or more UEs. For example, without limitation, in various embodiments a radio network controller or mobility management entity or any other network element is requested to form the neighbor list by an access point. In another embodiment, forming the candidate list includes at least one of requesting and receiving at least one neighboring wireless access point identifier from a UE.

As represented by block 2-3, the method includes forming the neighbor list by selecting at least one neighbor cell identifier from the candidate list. As represented by block 2-4, the method includes transmitting the formed neighbor list to one or more UEs. In one embodiment the neighbor list is formed for use by a particular UE and is transmitted for the sole use of that particular UE. In another embodiment, the neighbor list is formed for use by a number of UEs. Those skilled in the art will also appreciate that if a neighbor list cannot be formed by selecting from the candidate list (e.g. the candidate list is empty) a neighbor list will not be transmitted. In one embodiment, the access point sends a message to one or more UE's indicating that there are no neighbor cells.

Figure 3:
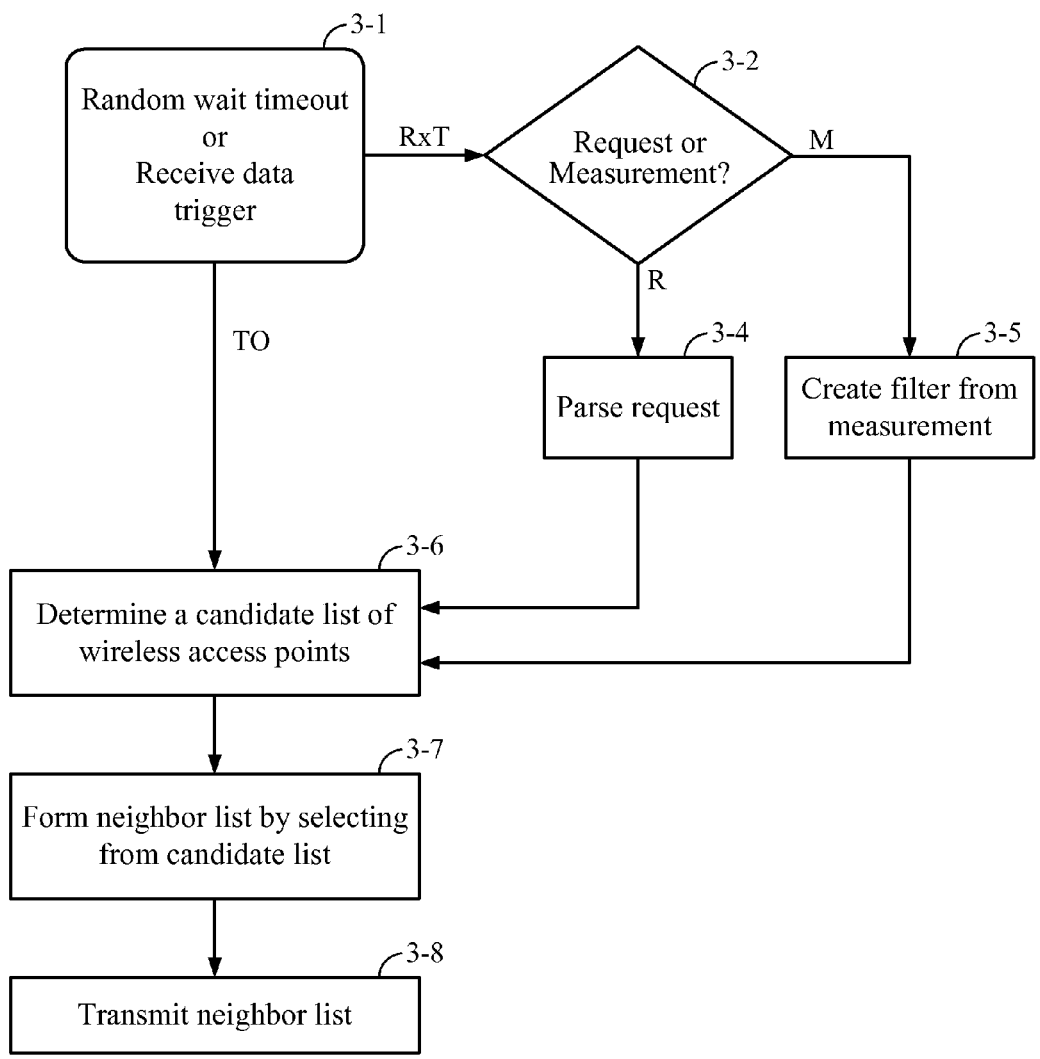
FIG. 3 is a flowchart illustrating a second method of forming a neighbor cell list.

FIG. 3 is a flowchart illustrating a second method of forming a neighbor cell list. In one example, the method is performed by the access point currently servicing a particular UE. In another example, the method is performed by another network node or even the core network at the request of the access point currently servicing a particular UE. As represented by block 3-1, the method includes waiting for a random time before determining a candidate list of wireless access points and receiving a trigger that interrupts the random wait time. If the random wait time is interrupted by a received data trigger (RxT path from 3-1), as represented by block 3-2, the method includes determining whether the received data trigger is a request from one or more UEs or a measurement.

If the received data trigger is a request (R path from 3-2), as represented by block 3-4, the method includes parsing the request to determine if a UE has provided any information along with the request that can be used to influence the formation the neighbor list. For example, in one embodiment a UE can include in the request, one or more neighbor cell identifiers that the UE cannot receive access from. In another example, a UE can provide information about which, if any, closed subscriber groups the UE does or does not belong to. Such neighbor cell identifiers can then appropriately be left off or included on the neighbor list transmitted to the UE.

On the other hand, if the received data trigger is a measurement (M path from 3-2), as represented by block 3-5, the method includes creating and/or retrieving a stored filter useful for forming the neighbor list from the measurement. For example, various measurements, without limitation, include a measure of the position of a wireless access point in the candidate list, a measure of the type of cell provided by the wireless access point, a measure of the size of the cell provided by the wireless access point, a measure of the frequency of handoffs to a particular wireless access point, an estimate of the probability that a wireless access point is available as a neighbor, an estimate of the relative importance of a wireless access point, and a measure of the relative geographic position of a wireless access point. Additionally and/or alternatively, possible measurements also include, without limitation, a measure of the speed of a user device, a measure of the trajectory of a user device, a measure of the present location of a user device, an indicator identifying an antenna or antenna group currently being used to service a user device, an indicator of proximity of the user device to one or more wireless access points, and reporting by a user device. The filter can be configured to leave off or include particular neighbor cell identifiers on the neighbor cell list.

In one embodiment, the method includes actions represented by block 3-6 after both the actions represented by blocks 3-4 and 3-5 discussed above. Block 3-6 is discussed in greater detail below.

Referring again to block 3-1, if the random wait time is not interrupted (TO path from 3-1), the method includes bypassing portions of the method represented by blocks 3-2, 3-4 and 3-5. As represented by block 3-6, the method includes determining a candidate list of wireless access points, including any combination of macro, pico, and femto nodes, in relatively close proximity to a particular access point that is either forming the neighbor list or requesting formation of the neighbor list. As represented by block 3-7, the method includes forming the neighbor list by selecting at least one neighbor cell identifier from the candidate list. As represented by block 3-8, the method includes transmitting the formed neighbor list to one or more UEs.

Figure 4:
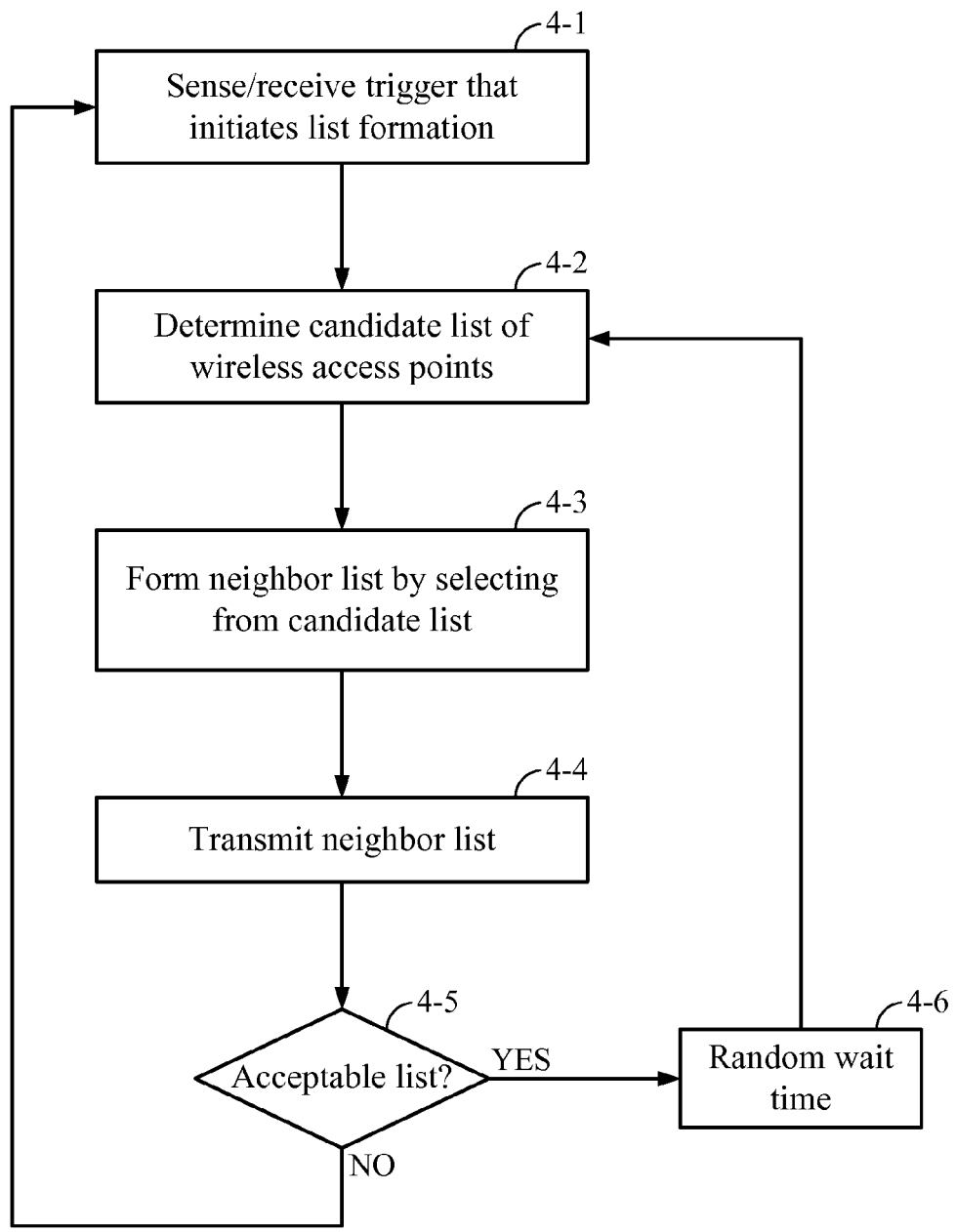
FIG. 4 is a flowchart illustrating a third method of forming a neighbor cell list.

FIG. 4 is a flowchart illustrating a third method of forming a neighbor cell list. In one example, the method is performed by the access point currently servicing a particular UE. In another example, the method is performed by another network node or even the core network at the request of the access point currently servicing a particular UE. As represented by block 4-1, the method includes sensing and/or receiving a trigger that initiates the formation and subsequent transmission of a neighbor cell list to one or more UEs. As represented by block 4-2, the method includes determining a candidate list of wireless access points, including any combination of macro, pico, and femto nodes, in relatively close proximity to a particular access point either forming the neighbor list or requesting formation of the neighbor list. As represented by block 4-3, the method includes forming the neighbor list by selecting at least one neighbor cell identifier from the candidate list. As represented by block 4-4, the method includes transmitting the formed neighbor list to one or more UEs.

As represented by block 4-5, the method includes determining whether or not the neighbor list transmitted to a UE was acceptable to the UE. Determining that a UE has not accepted the transmitted neighbor list includes, without limitation, receiving a report that the UE has not accepted the transmitted neighbor list. Determining that a UE has accepted the transmitted neighbor list includes, without limitation, at least one of not receiving an indication to the contrary for a duration after the neighbor list is transmitted, receiving a request to handover service to a UE to a neighboring wireless access point, receiving a report indicating that a UE has accepted the transmitted neighbor list If the neighbor list is determined to have been acceptable to a UE (yes path from 4-5), as represented by block 4-6, the method includes waiting a random amount of time before iteratively determining a candidate list, as represented by block 4-2. On the other hand, if the neighbor list is determined to have not been acceptable to a UE (no path from 4-5), the method includes iteratively restarting the actions represented by block 4-1. Those skilled in the art will appreciate that in an alternative embodiment the decision paths from block 4-5 can be the opposite of what is illustrated in FIG. 4 and described above. For example, if the neighbor list is determined to have not been acceptable to a UE, an alternative method includes iteratively determining a candidate list, as represented by block 4-2.

Figure 5:
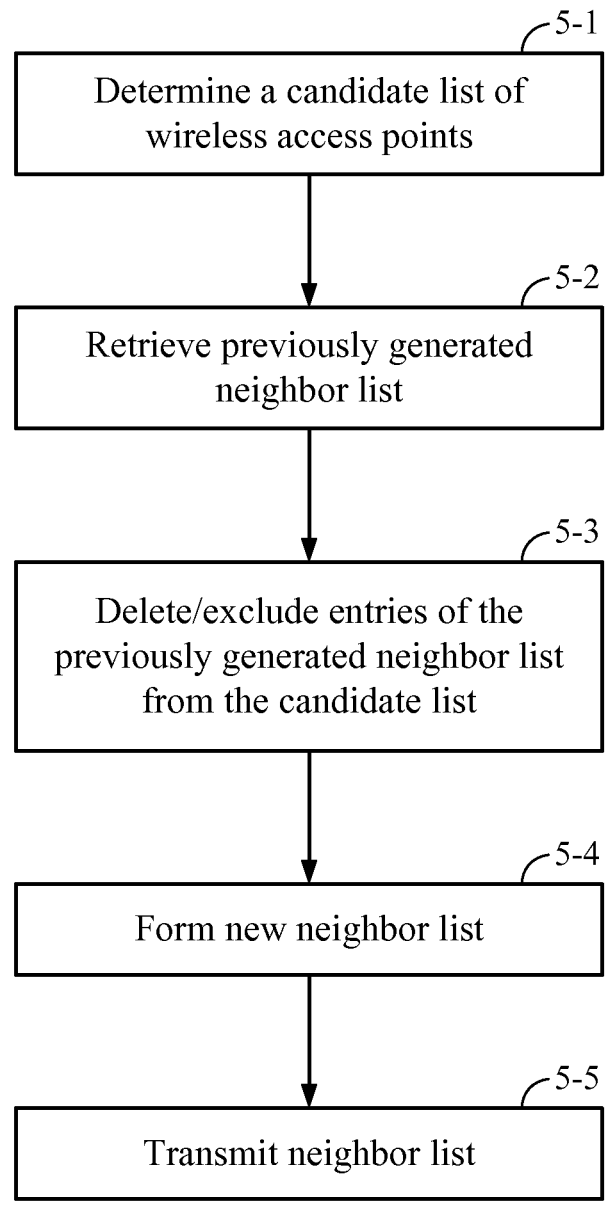
FIG. 5 is a flowchart illustrating a fourth method of forming a neighbor cell list.

FIG. 5 is a flowchart illustrating a fourth method of forming a neighbor cell list. In one example, the method is performed by the access point currently servicing a particular UE. In another example, the method is performed by another network node or even the core network at the request of the access point currently servicing a particular UE. As represented by block 5-1, the method includes determining a candidate list of wireless access points, including any combination of macro, pico, and femto nodes, in relatively close proximity to a particular access point either forming the neighbor list or requesting formation of the neighbor list. As represented by block 5-2, the method includes retrieving a previously generated neighbor list. Without limitation, in various embodiments, the previously generated neighbor list is retrieved from a non-transitory local memory, another wireless network element, an access point, a UE, a server, a host computer, and/or a cache on an electronic device. Those skilled in the art will appreciate that previously generated neighbor lists can be stored and retrieved from a multitude of places that are too numerous to exhaustively list herein.

As represented by block 5-3, the method includes deleting and/or excluding one or more entries on the previously generated neighbor list from the candidate list, so as to prevent those one or more entries from being selected for a newly formed neighbor list. As represented by block 5-4, the method includes forming the neighbor list by selecting at least one neighbor cell identifier from the candidate list. As represented by block 5-5, the method includes transmitting the formed neighbor list to one or more UEs.

Figure 6:
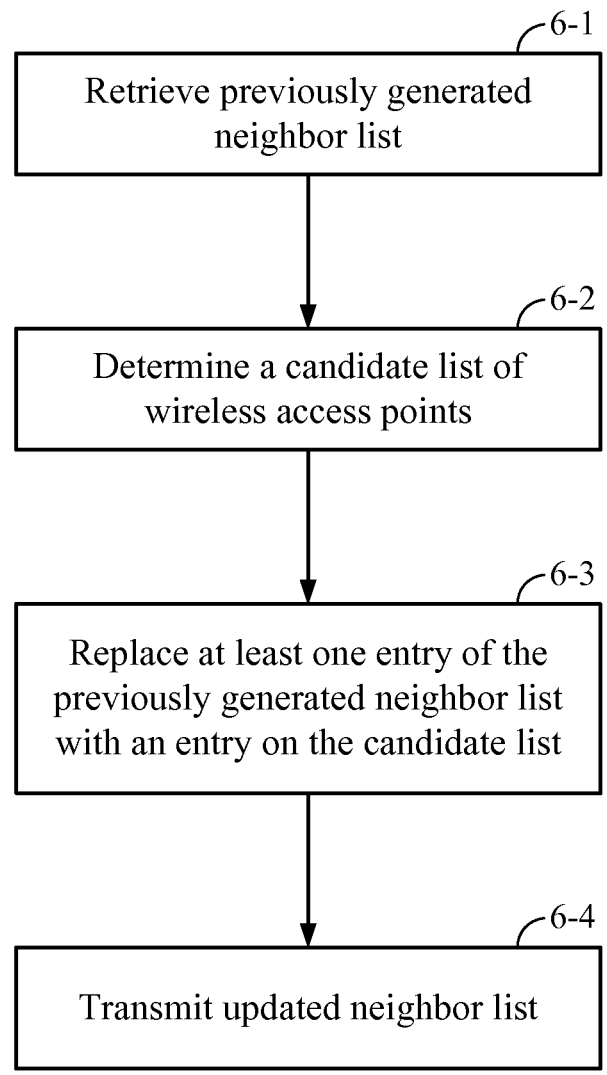
FIG. 6 is a flowchart illustrating a fifth method of forming a neighbor cell list.

FIG. 6 is a flowchart illustrating a fifth method of forming a neighbor cell list. In one example, the method is performed by the access point currently servicing a particular UE. In another example, the method is performed by another network node or even the core network at the request of the access point currently servicing a particular UE. As represented by block 6-1, the method includes retrieving a previously generated neighbor list. As represented by block 6-2, the method includes determining a candidate list of wireless access points, including any combination of macro, pico, and femto nodes, in relatively close proximity to a particular access point either forming the neighbor list or requesting formation of the neighbor list. As represented by block 6-3, the method includes forming a new neighbor list by replacing at least one entry of the previously generated neighbor list with an entry on the candidate list. In one embodiment, the entry chosen from the candidate list is chosen at least because it is not the same as any of the other entries on the previously generated neighbor list. As represented by block 6-4, the method includes transmitting the formed neighbor list to one or more UEs.

Figure 7:
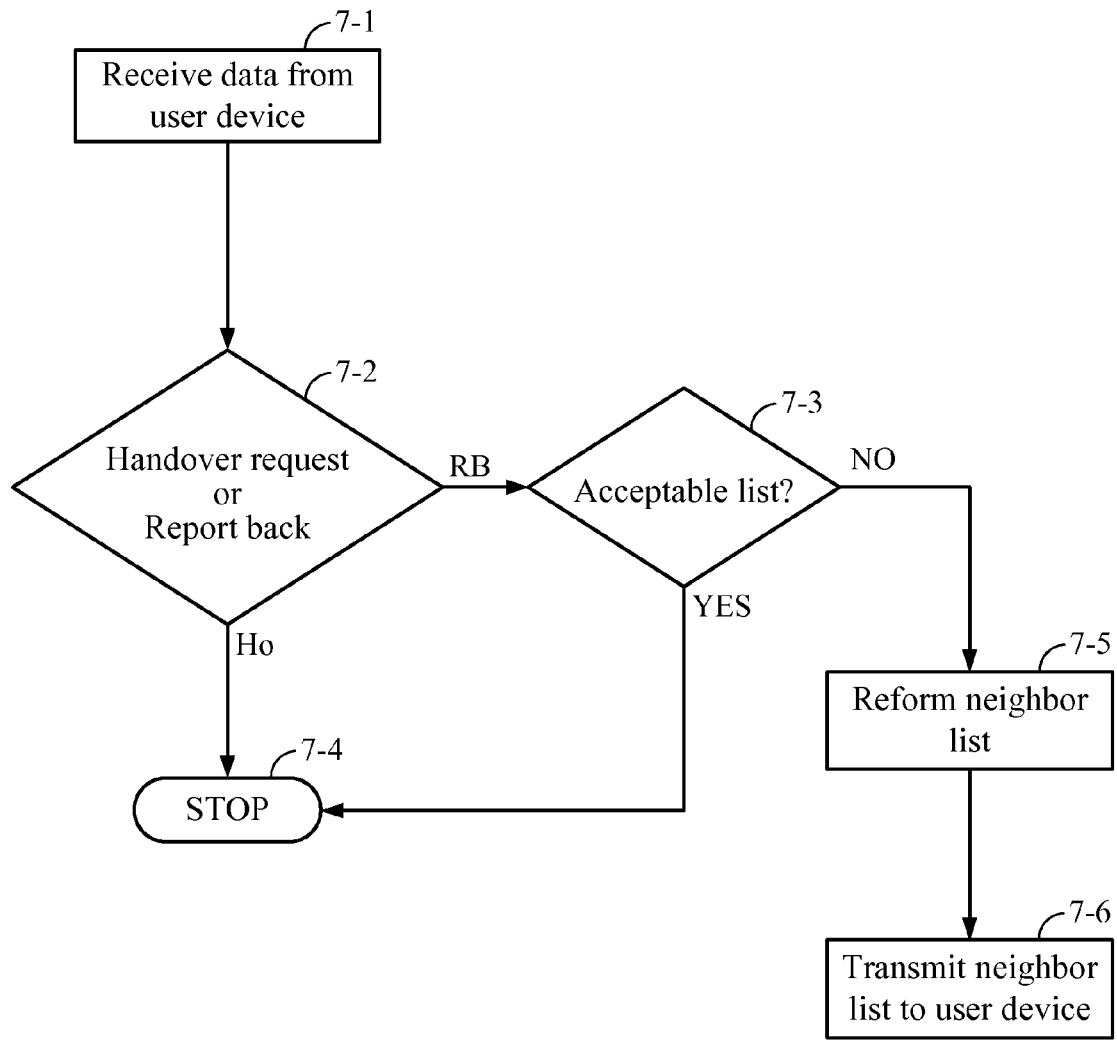
FIG. 7 is a flowchart illustrating a sixth method of forming a neighbor cell list.

FIG. 7 is a flowchart illustrating a sixth method of forming a neighbor cell list. In one example, the method is performed by the access point currently servicing a particular UE. In another example, the method is performed by another network node or even the core network at the request of the access point currently servicing a particular UE. As represented by block 7-1, the method includes receiving data from a UE. As represented by block 7-2, the method includes determining whether the received data is a handover request from the UE or a report from the UE. If the received data is a handover request (HO path from 7-2), as represented by block 7-4, one embodiment of the method includes taking no further action. On the other hand, if the received data is a report sent back from the UE (RB path from 7-2), as represented by block 7-3, the method includes determining whether or not a previously transmitted neighbor list was accepted to the UE by parsing the report sent back from the UE.

If it is determined that the previously transmitted neighbor list was acceptable (yes path from 7-3), as represented by block 7-4, one embodiment of the method includes taking no further action, as described above. On the other hand, if it is determined that the previously transmitted neighbor list was not acceptable (no path from 7-3), as represented by block 7-5, the method includes reforming a neighbor list. The neighbor list can be reformed according to any of the various method described above and/or various combinations of actions described above. As represented by block 7-6, the method includes transmitting the formed neighbor list to one or more UEs.

Figure 8:
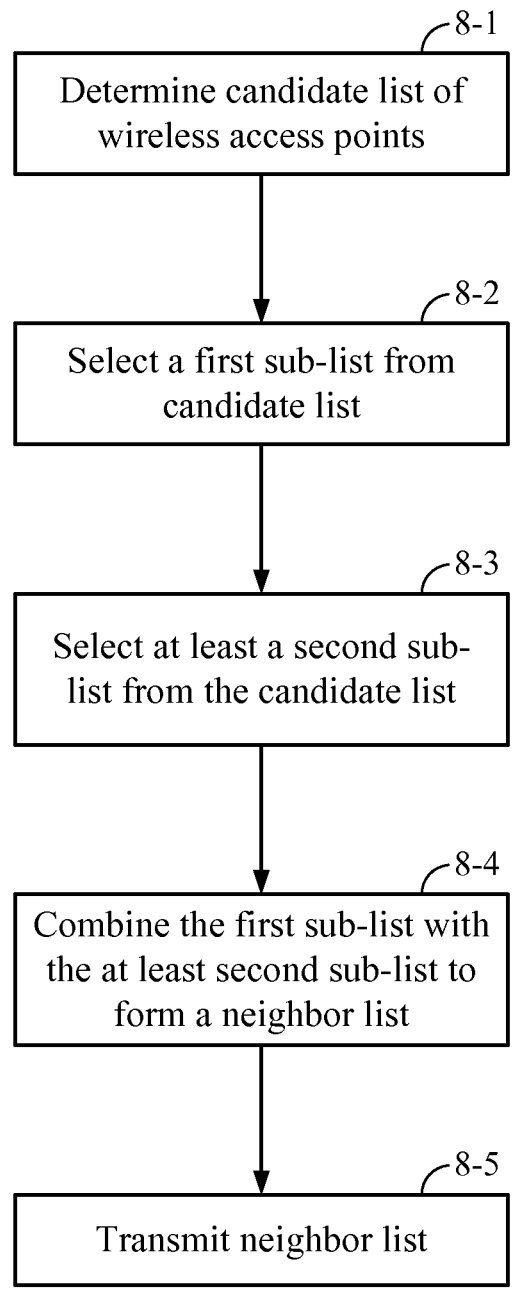
FIG. 8 is a flowchart illustrating a seventh method of forming a neighbor cell list.

FIG. 8 is a flowchart illustrating a seventh method of forming a neighbor cell list. In one example, the method is performed by the access point currently servicing a particular UE. In another example, the method is performed by another network node or even the core network at the request of the access point currently servicing a particular UE. As represented by block 8-1, the method includes determining a candidate list of wireless access points, including any combination of macro, pico, and femto nodes, in relatively close proximity to a particular access point either forming the neighbor list or requesting formation of the neighbor list. As represented by block 8-2, the method includes selecting a first sub-list of neighbor cell identifiers from the candidate list. Without limitation, the first sub-list includes wireless access points selected based on at least one of a measure of the position of a wireless access point in the candidate list, a measure of the type of cell provided by the wireless access point, a measure of the size of the cell provided by the wireless access point, a measure of the frequency of handoffs to a wireless access point, a measure of the probability that a wireless access point is available as a neighbor, a measure of the relative importance of a wireless access point, and a measure of the relative geographic position of a wireless access point.

As represented by block 8-3, the method includes selecting at least a second sub-list of neighbor cell identifiers from the candidate list. As represented by block 8-4, the method includes combining the first sub-list and at least the second sub-list to form a complete neighbor list. As represented by block 8-5, the method includes transmitting the formed neighbor list to one or more UEs.

Figure 9:
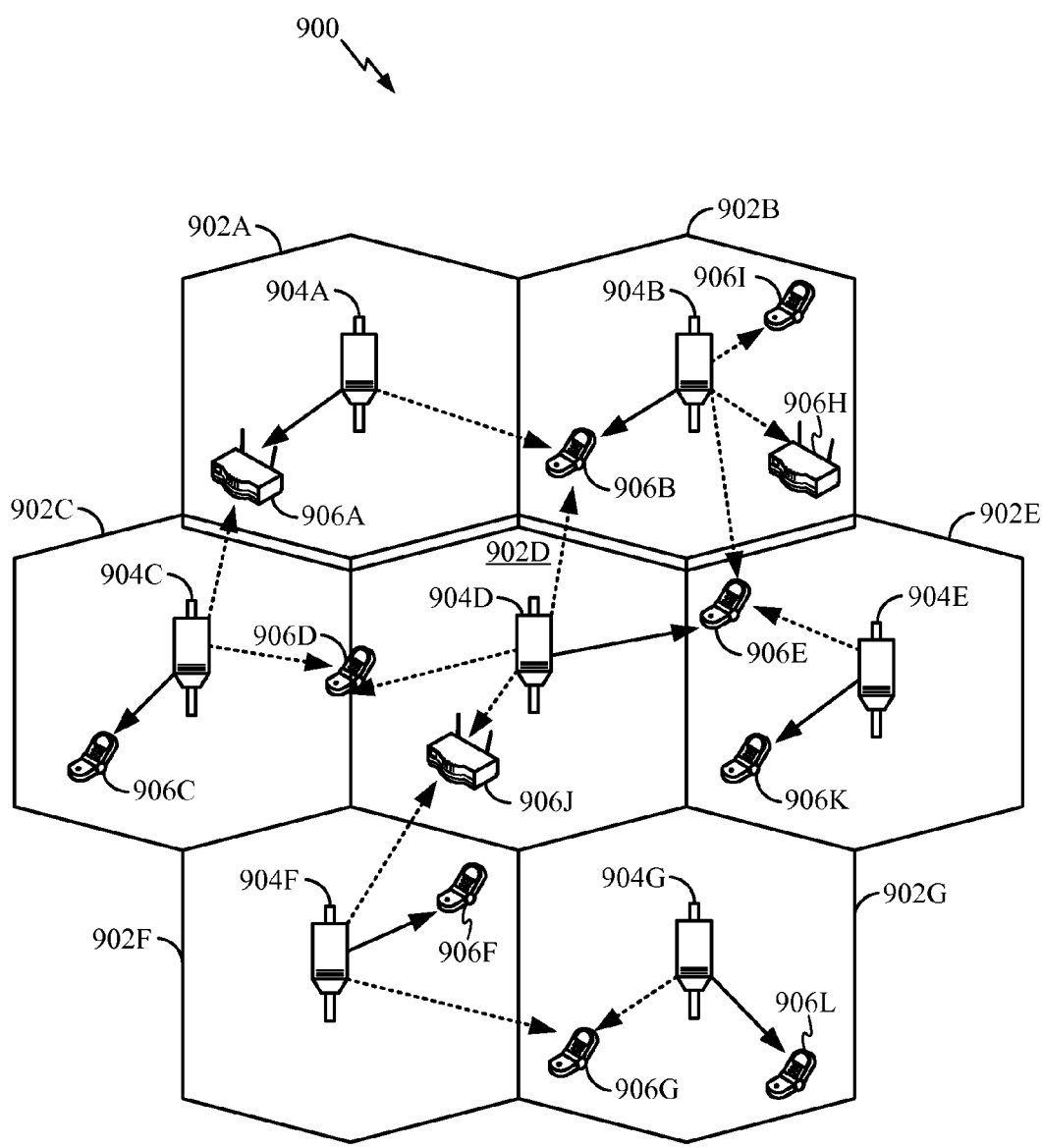
FIG. 9 is a simplified diagram of a wireless communication system.

FIG. 9 is a simplified diagram of a wireless communication system 900, configured to support a number of users, in which the teachings herein may be implemented. The system 900 provides communication for multiple cells 902, such as, for example, macro cells 902A-902G, with each cell being serviced by a corresponding access point 904 (e.g., access points 904A-904G). Access terminals 906 (e.g., access terminals 906A-906L) may be dispersed at various locations throughout the system over time. Each access terminal 906 may communicate with one or more access points 904 on a forward link (FL) and/or a reverse link (RL) at a given moment, depending upon whether the access terminal 906 is active and whether it is in soft handoff, for example. The wireless communication system 900 may provide service over a large geographic region. For example, macro cells 902A-902G may cover a few blocks in a densely populated urban neighborhood or several miles in rural environment.

Figure 10:
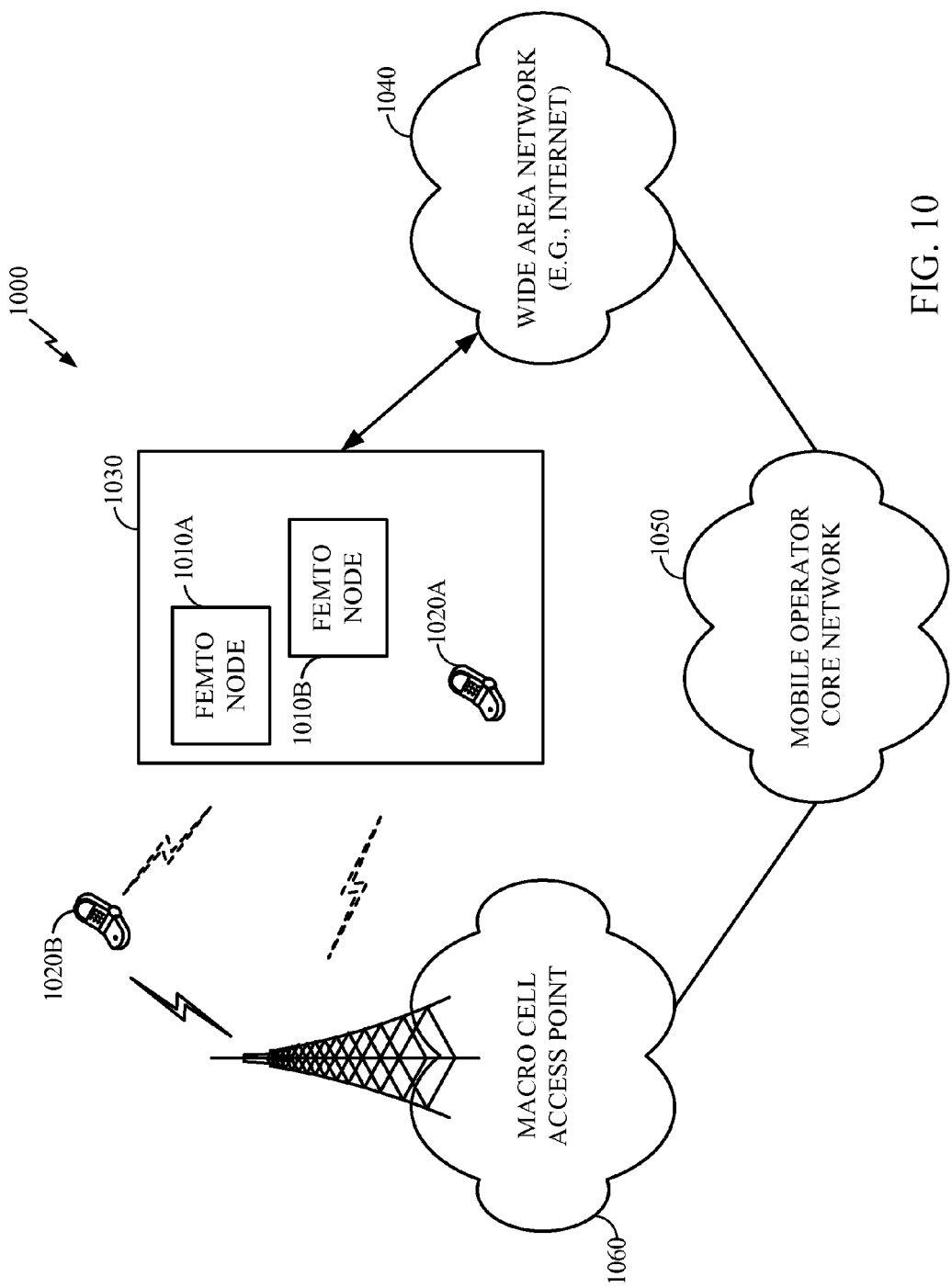
FIG. 10 is a simplified diagram of a wireless communication system including femto nodes.

FIG. 10 is a simplified diagram of an example communication system 1000 where one or more femto nodes are deployed within a network environment. Specifically, the system 1000 includes multiple femto nodes 1010 (e.g., femto nodes 1010A and 1010B) installed in a relatively small scale network environment (e.g., in one or more user residences 1030). Each femto node 1010 may be coupled to a wide area network 1040 (e.g., the Internet) and a mobile operator core network 1050 via a DSL router, a cable modem, a wireless link, or other connectivity means (not shown). As will be discussed below, each femto node 1010 may be configured to serve associated access terminals 1020 (e.g., access terminal 1020A) and, optionally, alien access terminals 1020 (e.g., access terminal 1020B). In other words, access to femto nodes 1010 may be restricted whereby a given access terminal 1020 may be served by a set of designated (e.g., home) femto node(s) 1010 but may not be served by any non-designated femto nodes 1010 (e.g., a neighbor's femto node 1010).

Figure 11:
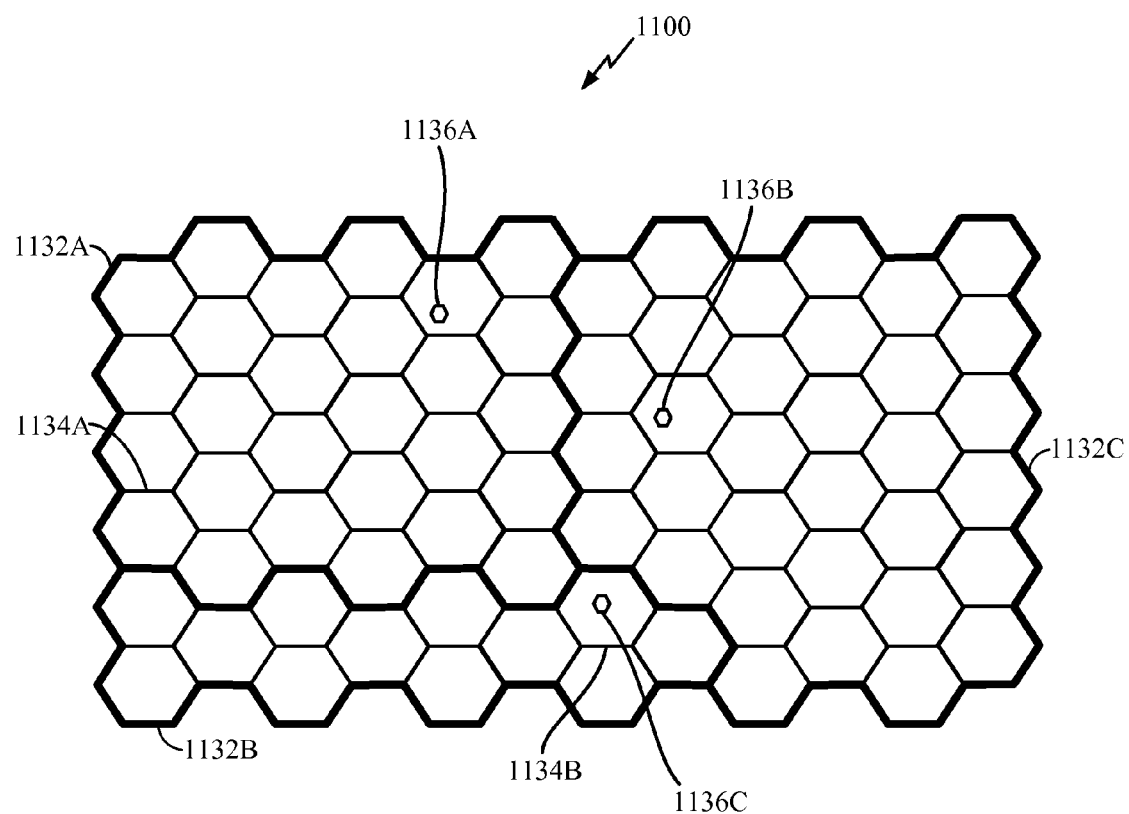
FIG. 11 is a simplified diagram illustrating coverage areas for wireless communication.

FIG. 11 is a simplified diagram illustrating an example of a coverage map 1100 where several tracking areas 1102 (or routing areas or location areas) are defined, each of which includes several macro coverage areas 1104. Here, areas of coverage associated with tracking areas 1102A, 1102B, and 1102C are delineated by the wide lines and the macro coverage areas 1104 are represented by the hexagons. The tracking areas 1102 also include femto coverage areas 1106. In this example, each of the femto coverage areas 1106 (e.g., femto coverage area 1106C) is depicted within a macro coverage area 1104 (e.g., macro coverage area 1104B). It should be appreciated, however, that a femto coverage area 1106 may not lie entirely within a macro coverage area 1104. In practice, a large number of femto coverage areas 1106 may be defined with a given tracking area 1102 or macro coverage area 1104. Also, one or more pico coverage areas (not shown) may be defined within a given tracking area 1102 or macro coverage area 1104.

Referring again to FIG. 10, the owner of a femto node 1010 may subscribe to mobile service, such as, for example, 3G mobile service, offered through the mobile operator core network 1050. In addition, an access terminal 1020 may be capable of operating both in macro environments and in smaller scale (e.g., residential) network environments. In other words, depending on the current location of the access terminal 1020, the access terminal 1020 may be served by a macro cell access point 1060 associated with the mobile operator core network 1050 or by any one of a set of femto nodes 1010 (e.g., the femto nodes 1010A and 1010B that reside within a corresponding user residence 1030). For example, when a subscriber is outside his home, he is served by a standard macro access point (e.g., access point 1060) and when the subscriber is at home, he is served by a femto node (e.g., node 1010A). Here, it should be appreciated that a femto node 1010 may be backward compatible with existing access terminals 1020.

A femto node 1010 may be deployed on a single frequency or, in the alternative, on multiple frequencies. Depending on the particular configuration, the single frequency or one or more of the multiple frequencies may overlap with one or more frequencies used by a macro access point (e.g., access point 1060).

In some aspects, an access terminal 1020 may be configured to connect to a preferred femto node (e.g., the home femto node of the access terminal 1020) whenever such connectivity is possible. For example, whenever the access terminal 1020 is within the user's residence 1030, it may be desired that the access terminal 1020 communicate only with the home femto node 1010.

In some aspects, if the access terminal 1020 operates within the macro cellular network 1050 but is not residing on its most preferred network (e.g., as defined in a preferred roaming list), the access terminal 1020 may continue to search for the most preferred network (e.g., the preferred femto node 1010) using a Better System Reselection (BSR), which may involve a periodic scanning of available systems to determine whether better systems are currently available, and subsequent efforts to associate with such preferred systems. With the acquisition entry, the access terminal 1020 may limit the search for specific band and channel. For example, the search for the most preferred system may be repeated periodically. Upon discovery of a preferred femto node 1010, the access terminal 1020 selects the femto node 1010 for camping within its coverage area.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 1010 that reside within the corresponding user residence 1030). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of access terminals. This set may be temporarily or permanently extended as useful. In some aspects, a closed subscriber group (CSG) may be defined as the set of access points (e.g., femto nodes) that share a common access control list of access terminals. A restricted access point may include a CSG that allows multiple access terminals to connect to it. A single access terminal may have the ability connect to multiple restricted access points. A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association (e.g., the femto node allows access to any access terminal). A restricted femto node may refer to a femto node that is restricted in some manner (e.g., restricted for association and/or registration). A home femto node may refer to a femto node on which the access terminal is authorized to access and operate on (e.g., permanent access is provided for a defined set of one or more access terminals). A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that is authorized to access the restricted femto node (e.g., the access terminal has permanent access to the femto node). A guest access terminal may refer to an access terminal with temporary access to the restricted femto node (e.g., limited based on deadline, time of use, bytes, connection count, or some other criterion or criteria). An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 12:
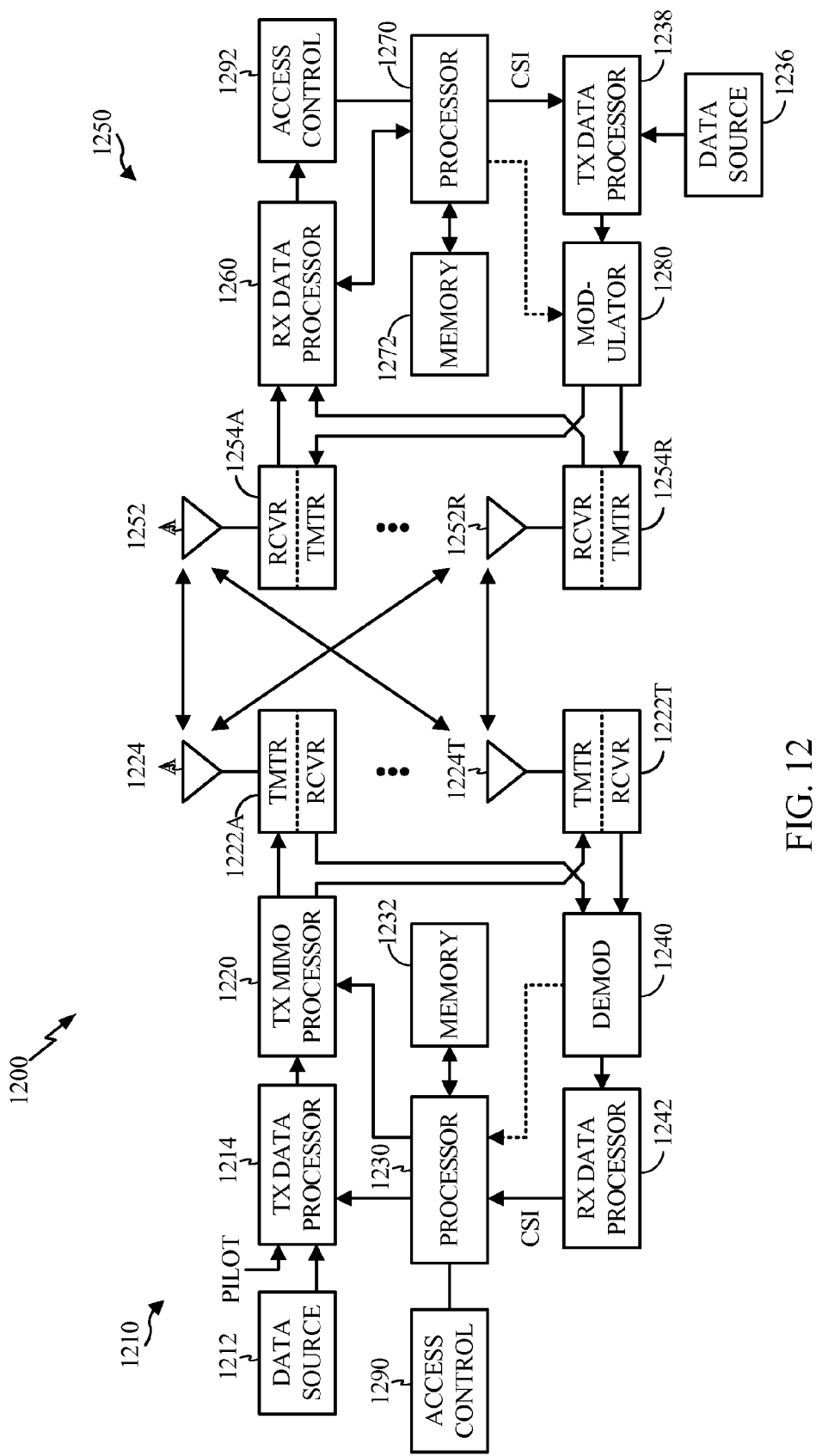
FIG. 12 is a simplified block diagram of several sample aspects of communication components.
Figure 13:
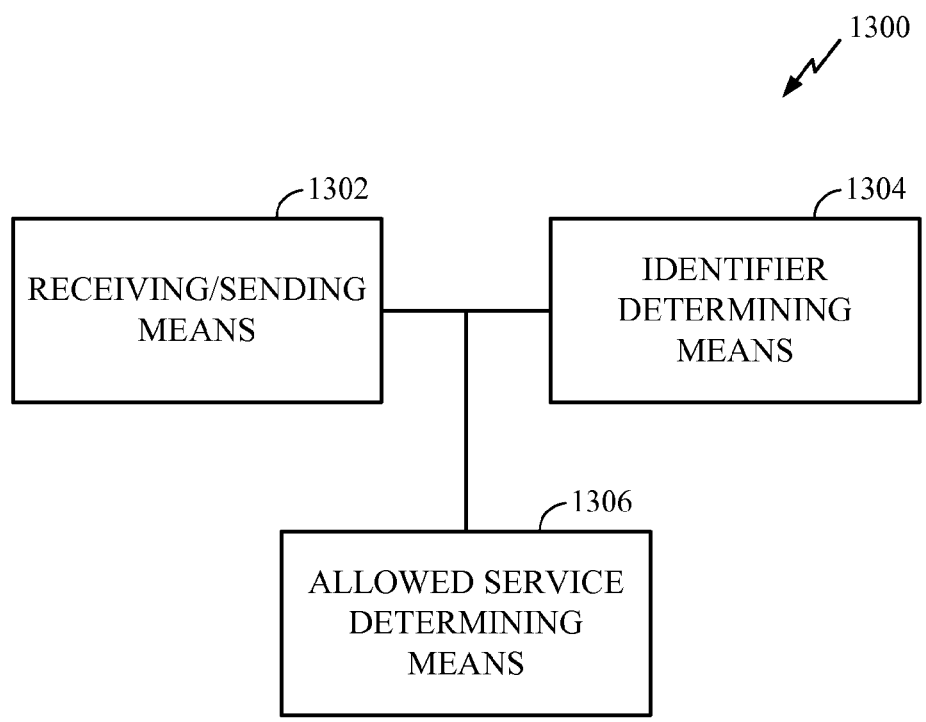
FIGS. 13-23 are simplified block diagrams of several sample aspects of apparatuses configured to provide provisioning and/or access management as taught herein.
Figure 14:
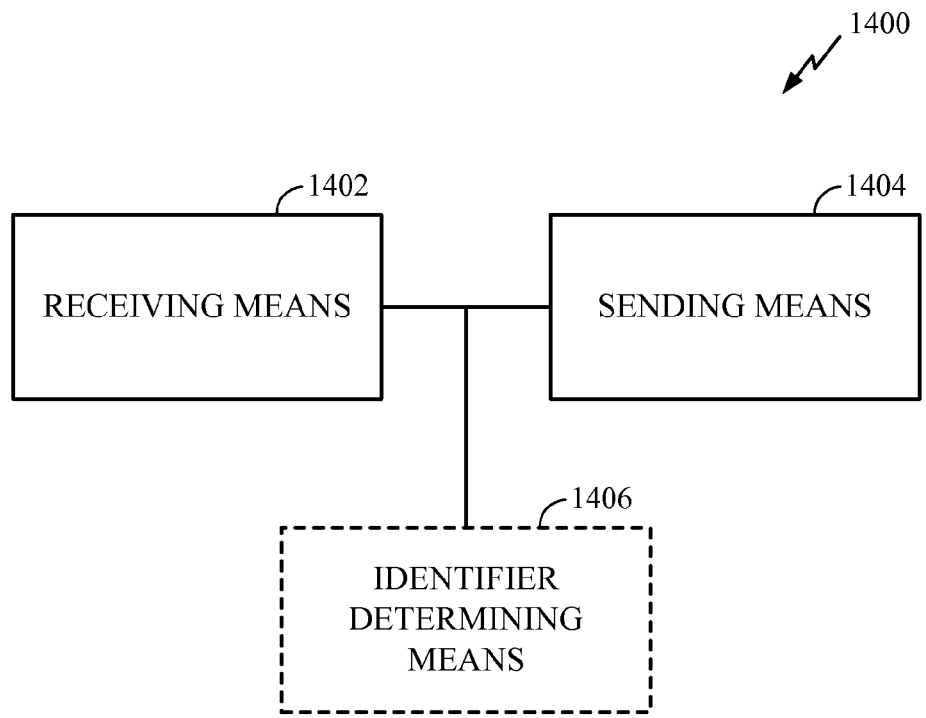
Figure 15:
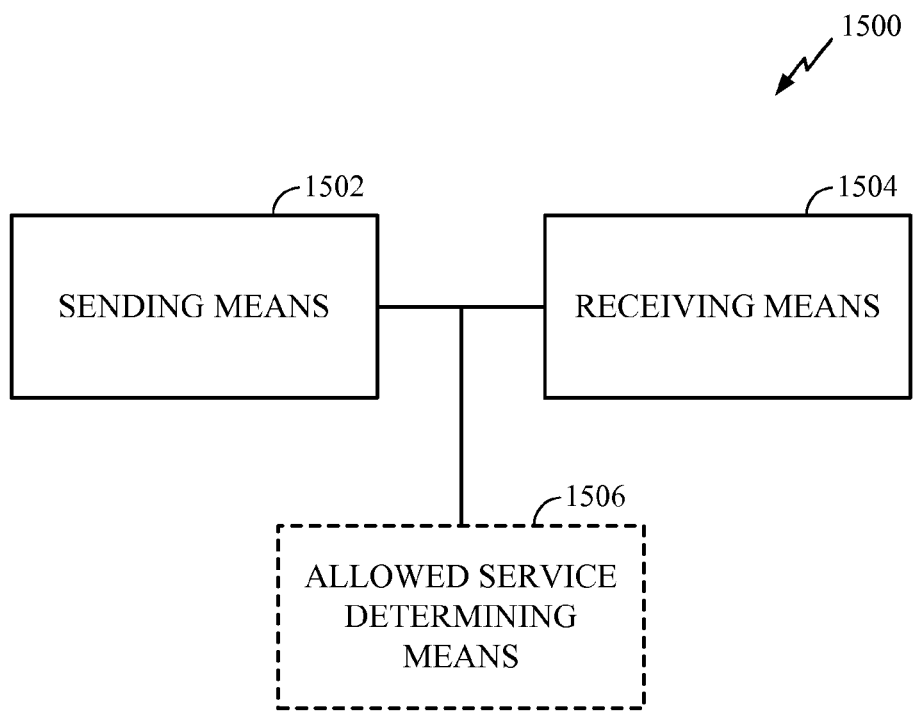
Figure 16:
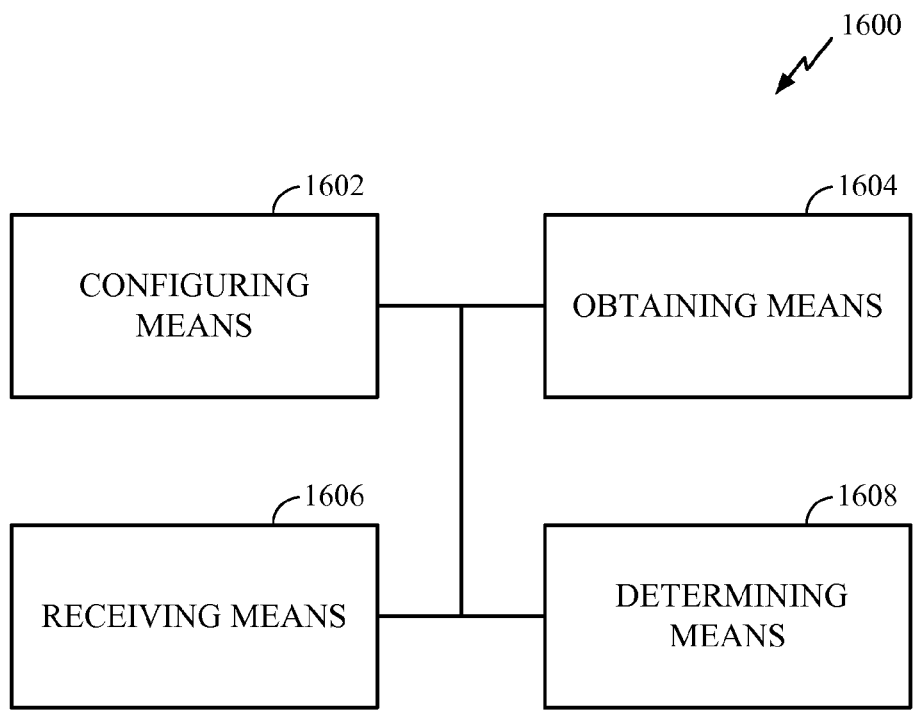
Figure 17:
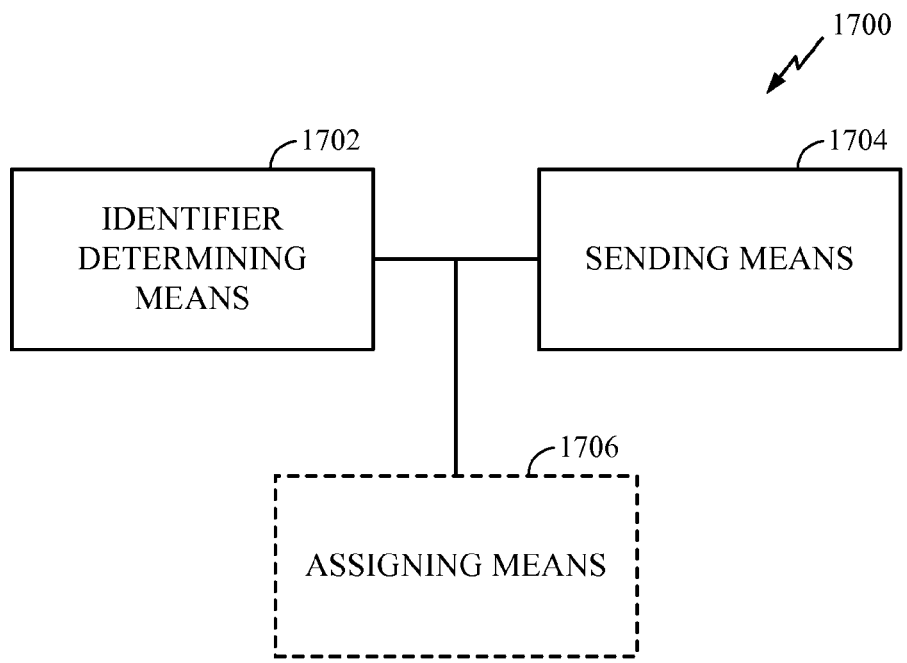
Figure 18:
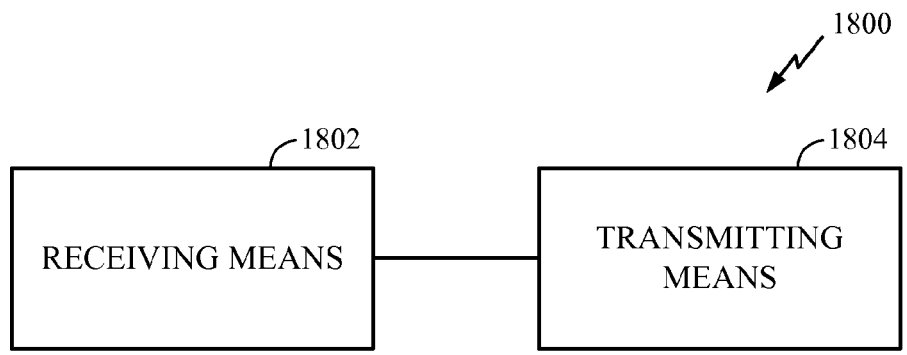
Figure 19:
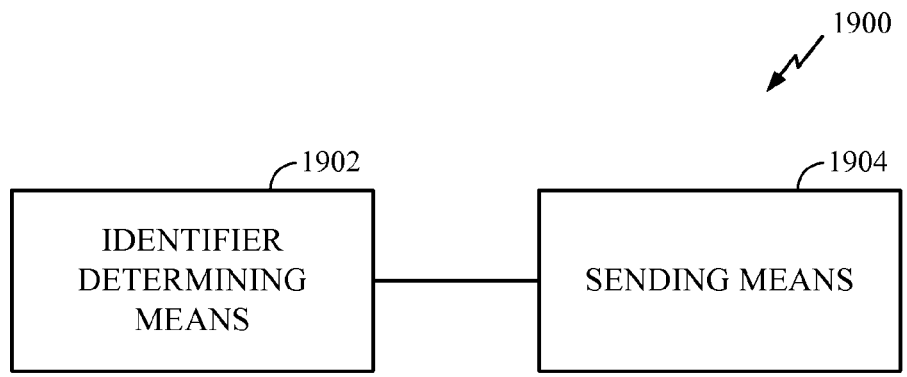
Figure 20:
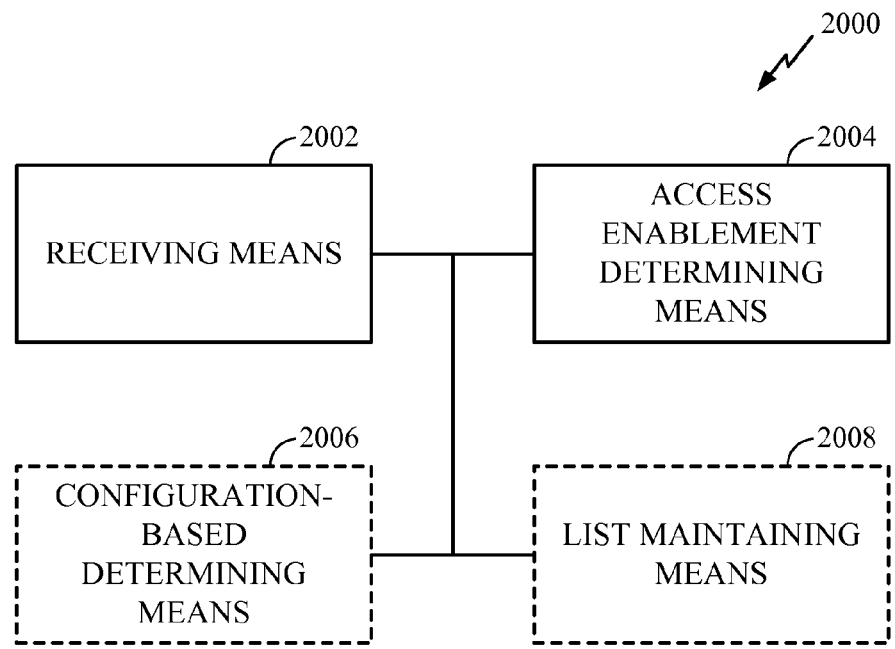
Figure 21:
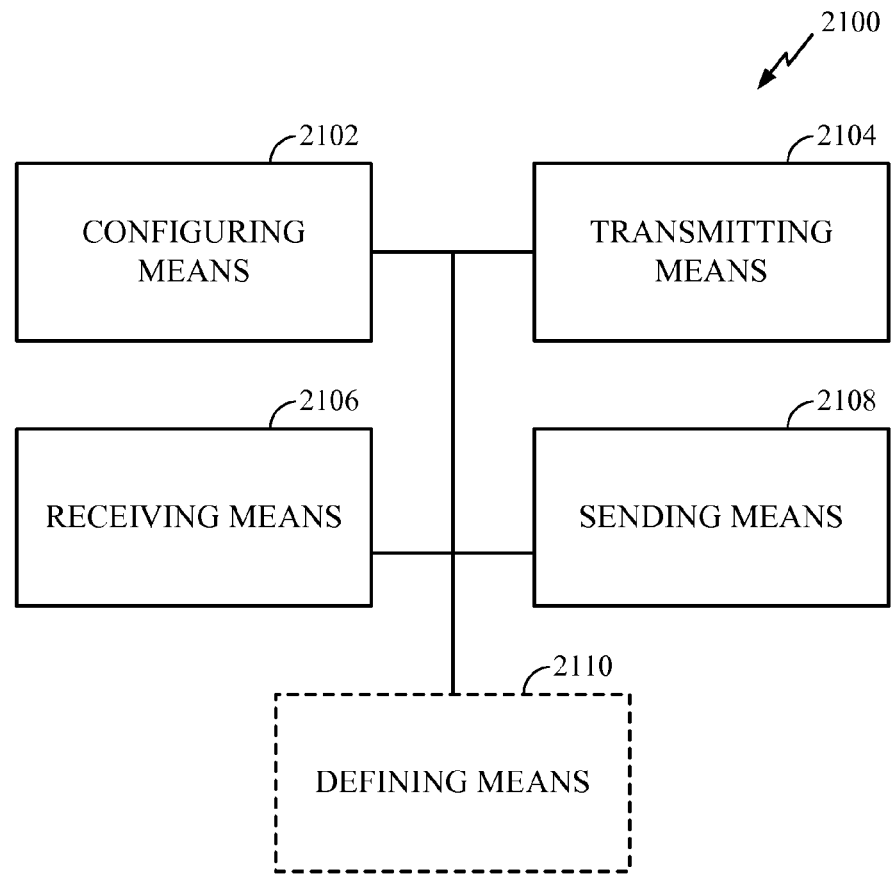
Figure 22:
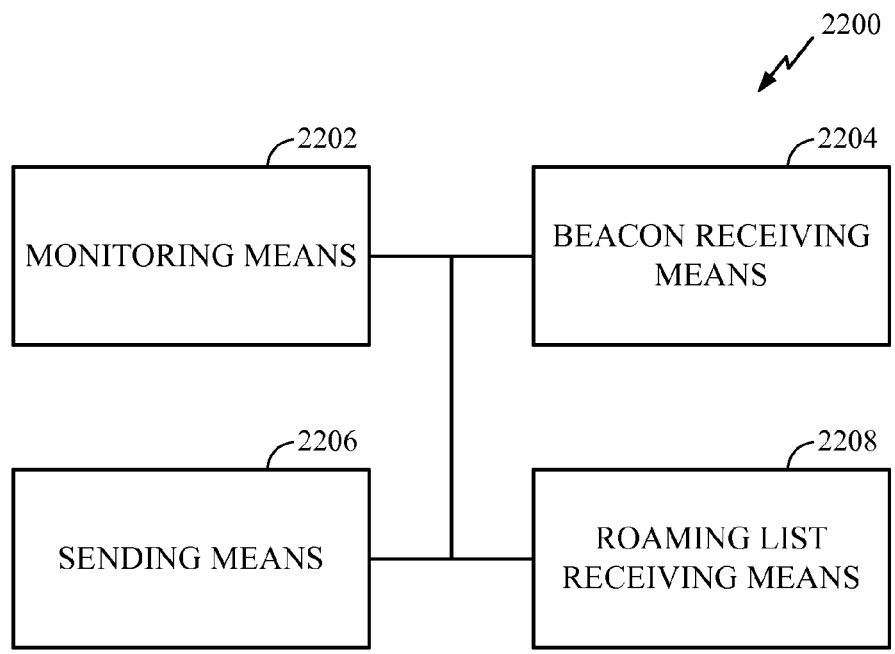
Figure 23:
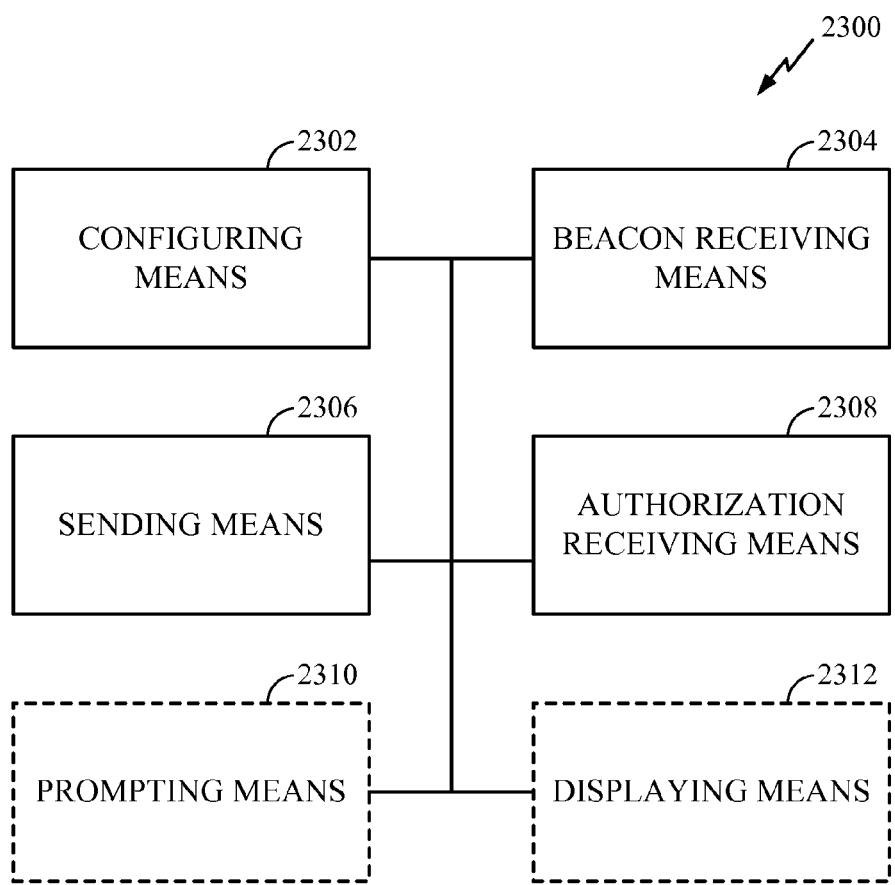

The teachings herein may be incorporated into a node (e.g., a device) employing various components for communicating with at least one other node. FIG. 12 depicts several sample components that may be employed to facilitate communication between nodes. Specifically, FIG. 12 is a simplified block diagram of a first wireless device 1210 (e.g., an access point) and a second wireless device 1250 (e.g., an access terminal) of a MIMO system 1200. At the first device 1210, traffic data for a number of data streams is provided from a data source 1212 to a transmit (TX) data processor 1214.

In some aspects, each data stream is transmitted over a respective transmit antenna. The TX data processor 1214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1230. A data memory 1232 may store program code, data, and other information used by the processor 1230 or other components of the device 1210.

The modulation symbols for all data streams are then provided to a TX MIMO processor 1220, which may further process the modulation symbols (e.g., for OFDM). The TX MIMO processor 1220 then provides $N_T$ modulation symbol streams to $N_T$ transceivers (XCVR) 1222A through 1222T. In some aspects, the TX MIMO processor 1220 applies beam-forming weights to the symbols of the data streams and to the antenna from which the symbol is being transmitted.

Each transceiver 1222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1222A through 1222T are then transmitted from $N_T$ antennas 1224A through 1224T, respectively.

At the second device 1250, the transmitted modulated signals are received by $N_R$ antennas 1252A through 1252R and the received signal from each antenna 1252 is provided to a respective transceiver (XCVR) 1254A through 1254R. Each transceiver 1254 conditions (e.g., filters, amplifies, and downconverts) a respective received signal, digitizes the conditioned signal to provide samples, and further processes the samples to provide a corresponding "received" symbol stream.

A receive (RX) data processor 1260 then receives and processes the $N_R$ received symbol streams from $N_R$ transceivers 1254 based on a particular receiver processing technique to provide $N_T$ "detected" symbol streams. The RX data processor 1260 then demodulates, deinterleaves, and decodes each detected symbol stream to recover the traffic data for the data stream. The processing by the RX data processor 1260 is complementary to that performed by the TX MIMO processor 1220 and the TX data processor 1214 at the device 1210.

A processor 1270 periodically determines which pre-coding matrix to use (discussed below). The processor 1270 formulates a reverse link message comprising a matrix index portion and a rank value portion. A data memory 1272 may store program code, data, and other information used by the processor 1270 or other components of the second device 1250.

The reverse link message may comprise various types of information regarding the communication link and/or the received data stream. The reverse link message is then processed by a TX data processor 1238, which also receives traffic data for a number of data streams from a data source 1236, modulated by a modulator 1280, conditioned by the transceivers 1254A through 1254R, and transmitted back to the device 1210.

At the device 1210, the modulated signals from the second device 1250 are received by the antennas 1224, conditioned by the transceivers 1222, demodulated by a demodulator (DEMOD) 1240, and processed by a RX data processor 1242 to extract the reverse link message transmitted by the second device 1250. The processor 1230 then determines which precoding matrix to use for determining the beam-forming weights then processes the extracted message.

FIG. 12 also illustrates that the communication components may include one or more components that perform access control operations as taught herein. For example, an access control component 1290 may cooperate with the processor 1230 and/or other components of the device 1210 to send/receive signals to/from another device (e.g., device 1250) as taught herein. Similarly, an access control component 1292 may cooperate with the processor 1270 and/or other components of the device 1250 to send/receive signals to/from another device (e.g., device 1210). It should be appreciated that for each device 1210 and 1250 the functionality of two or more of the described components may be provided by a single component. For example, a single processing component may provide the functionality of the access control component 1290 and the processor 1230 and a single processing component may provide the functionality of the access control component 1292 and the processor 1270.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The components described herein may be implemented in a variety of ways. Referring to FIGS. 13-23, apparatuses 1300, 1400, 1500, 1600, 1700, 1800, 1900, 2000, 2100, 2200, and 2300 are represented as a series of interrelated functional blocks. In some aspects the functionality of these blocks may be implemented as a processing system including one or more processor components. In some aspects the functionality of these blocks may be implemented using, for example, at least a portion of one or more integrated circuits (e.g., an ASIC). As discussed herein, an integrated circuit may include a processor, software, other related components, or some combination thereof. The functionality of these blocks also may be implemented in some other manner as taught herein. In some aspects one or more of the dashed blocks in FIGS. 13-23 are optional.

The apparatuses 1300, 1400, 1500, 1600, 1700, 1800, 1900, 2000, 2100, 2200, and 2300 may include one or more modules that may perform one or more of the functions described above with regard to various figures. For example, a receiving/sending means 1302 may correspond to, for example, a communication controller as discussed herein. An identifier determining means 1304 may correspond to, for example, an access controller as discussed herein. An allowed service determining means 1306 may correspond to, for example, an access controller as discussed herein. A receiving means 1402 may correspond to, for example, a communication controller as discussed herein. A sending means 1404 may correspond to, for example, an access controller as discussed herein. An identifier determining means 1406 may correspond to, for example, an access controller as discussed herein. A sending means 1502 may correspond to, for example, an access controller as discussed herein. A receiving means 1504 may correspond to, for example, a communication controller as discussed herein. An allowed service determining means 1506 may correspond to, for example, an access controller as discussed herein. A configuring means 1602 may correspond to, for example, a provisioning controller as discussed herein. An obtaining means 1604 may correspond to, for example, an access controller as discussed herein. A receiving means 1606 may correspond to, for example, a communication controller as discussed herein. A determining means 1608 may correspond to, for example, an access controller as discussed herein. An identifier determining means 1702 may correspond to, for example, an provisioning controller as discussed herein. A sending means 1704 may correspond to, for example, a communication controller as discussed herein. An assigning means 1706 may correspond to, for example, a provisioning controller as discussed herein. A receiving means 1802 may correspond to, for example, a provisioning controller as discussed herein. A transmitting means 1804 may correspond to, for example, a communication controller as discussed herein. An identifier determining means 1902 may correspond to, for example, a provisioning controller as discussed herein. A sending means 1904 may correspond to, for example, a communication controller as discussed herein. A receiving means 2002 may correspond to, for example, a communication controller as discussed herein. An access enablement determining means 2004 may correspond to, for example, an access controller as discussed herein. A configuration-based determining means 2006 may correspond to, for example, an access controller as discussed herein. A list maintaining means 2008 may correspond to, for example, an access controller as discussed herein. A configuring means 2102 may correspond to, for example, a provisioning controller as discussed herein. A transmitting means 2104 may correspond to, for example, a communication controller as discussed herein. A receiving means 2106 may correspond to, for example, a communication controller as discussed herein. A sending means 2108 may correspond to, for example, a provisioning controller as discussed herein. A defining means 2110 may correspond to, for example, a provisioning controller as discussed herein. A monitoring means 2202 may correspond to, for example, a receiver as discussed herein. A beacon receiving means 2204 may correspond to, for example, a receiver as discussed herein. A sending means 2206 may correspond to, for example, a communication controller as discussed herein. A roaming list receiving means 2208 may correspond to, for example, a provisioning controller as discussed herein. A configuring means 2302 may correspond to, for example, a provisioning controller as discussed herein. A beacon receiving means 2304 may correspond to, for example, a receiver as discussed herein. A sending means 2306 may correspond to, for example, a communication controller as discussed herein. An authorization receiving means 2308 may correspond to, for example, an access controller as discussed herein. A prompting means 2310 may correspond to, for example, an access controller as discussed herein. A displaying means 2312 may correspond to, for example, an access controller as discussed herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

The above description is provided to enable any person skilled in the art to make or use embodiments within the scope of the appended claims. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of forming a list of neighboring wireless access points, the method comprising:
    determining a candidate list, the candidate list including a plurality of neighboring wireless access points, wherein each of the plurality of neighboring wireless access points has at least one characteristic by which that particular neighboring wireless access point can be selected; and
    selecting, by a processor, at least one neighboring wireless access point from the candidate list to form a neighbor list based on a measure of a frequency of handoffs to the at least one neighboring wireless access point, the neighbor list including a subset of the plurality of neighboring wireless access points included in the candidate list.

2. The method of claim 1, wherein determining the candidate list comprises at least one of reading and receiving the candidate list from a computer readable memory.

3. The method of claim 1, wherein determining the candidate list comprises at least one of requesting and receiving the candidate list from a management node.

4. The method of claim 1, wherein determining the candidate list comprises at least one of requesting and receiving the candidate list from a network.

5. The method of claim 1, wherein determining the candidate list comprises at least one of requesting and receiving the candidate list from a radio network controller.

6. The method of claim 1, wherein the determining the candidate list comprises at least one of requesting and receiving at least one neighboring wireless access point identifier from an access terminal.

7. The method of claim 1, wherein the plurality of neighboring wireless access points includes at least one of base stations providing macro cells and femto node providing cells smaller than macro cells.

8. The method of claim 1, wherein the plurality of neighboring wireless access points includes at least one of wireless access points providing adjacent cells to one another and wireless access points providing overlapping cells in combination with other wireless access points.

9. The method of claim 1, further comprising sensing a trigger that initiates forming a list of neighboring wireless access points.

10. The method of claim 9, wherein the trigger includes at least one of a measure of the time elapsed since a previous neighbor list was formed, a received request from a user device for a new neighbor list, and a measurement based on the motion of a user device.

11. The method of claim 1, further comprising:
transmitting the neighbor list to at least one user device;
determining whether or not the at least one user device has accepted the transmitted neighbor list; and
forming a new neighbor list when it is determined that the at least one user device has not accepted the transmitted neighbor list.

12. The method of claim 11, wherein forming the new neighbor list comprises:
deleting the wireless access points in a previously formed neighbor list from the candidate list to produce an updated candidate list;
selecting wireless access points from the updated candidate list to form the new neighbor list.

13. The method of claim 12, further comprising iteratively forming new neighbor lists until it is determined that the at least one user device has accepted a neighbor list.

14. The method of claim 11, wherein forming the new neighbor list comprises selecting at least one wireless access point for the new neighbor list that was not included in a previously formed neighbor list.

15. The method of claim 11, wherein determining that the at least one user device has not accepted the transmitted neighbor list includes at least one of receiving a report that the at least one user device has not accepted the transmitted neighbor list.

16. The method of claim 11, wherein determining that the at least one user device has accepted the transmitted neighbor list includes at least one of not receiving an indication to the contrary for a duration after the neighbor list is transmitted, receiving a request to handover service to the at least one user device to a neighboring wireless access point, receiving a report indicating that the at least one user device has accepted the transmitted neighbor list.

17. The method of claim 1, wherein the at least one characteristic includes at least one of a measure of the position of a wireless access point in the candidate list, a measure of the type of cell provided by the wireless access point, a measure of the size of the cell provided by the wireless access point, a measure of the frequency of handoffs to a particular wireless access point, an estimate of the probability that a wireless access point is available as a neighbor, an estimate of the relative importance of a wireless access point, and a measure of the relative geographic position of a wireless access point.

18. The method of claim 1, wherein wireless access points are selected for the neighbor list based on at least one of a measure of the speed of a user device, a measure of the trajectory of a user device, a measure of the present location of a user device, an indicator identifying an antenna or antenna group currently being used to service a user device, an indicator of proximity of the user device to one or more wireless access points, and reporting by a user device.

19. The method of claim 1, further comprising selecting wireless access points for the neighbor list by:
selecting a first sub-list of preferred wireless access points from the candidate list; and
selecting at least a second sub-list of wireless access points to complete the neighbor list.

20. The method of claim 19, wherein the first sub-list includes wireless access points selected based on at least one of a measure of the position of a wireless access point in the candidate list, a measure of the type of cell provided by the wireless access point, a measure of the size of the cell provided by the wireless access point, a measure of the frequency of handoffs to a wireless access point, a measure of the probability that a wireless access point is available as a neighbor, a measure of the relative importance of a wireless access point, and a measure of the relative geographic position of a wireless access point.

21. The method of claim 1, further comprising:
transmitting the neighbor list to at least one user device;
estimating whether or not the at least one user device has had an opportunity to accept the transmitted neighbor list; and
forming a new neighbor list when it is estimated that the at least one user device has not accepted the transmitted neighbor list.

22. The method of claim 1, wherein determining the candidate list comprises determining by a network node, and wherein the plurality of neighboring wireless access points comprises wireless access points adjacent to the access point in communication with the user device.

23. The method of claim 1, wherein the selecting of the at least one neighboring wireless access point from the candidate list to form the neighbor list further comprises selecting based on a measure of a speed of the user device or a measure of a trajectory of the user device.

24. The method of claim 1, wherein the selecting of the at least one neighboring wireless access point from the candidate list to form the neighbor list further comprises selecting based on a measure of a present location of the user device or an indicator of proximity of the user device to one or more wireless access points.

25. The method of claim 1, wherein the selecting of the at least one neighboring wireless access point from the candidate list to form the neighbor list further comprises selecting based on an indicator identifying an antenna or antenna group currently being used to service the user device.

26. The method of claim 1, wherein the selecting of the at least one neighboring wireless access point from the candidate list to form the neighbor list further comprises selecting based on an estimate of a probability that the at least one neighboring wireless access point is available as a neighbor.

27. The method of claim 1, wherein the selecting of the at least one neighboring wireless access point from the candidate list to form the neighbor list further comprises selecting based on a characteristic of a user device in communication with the neighboring wireless access point.

28. The method of claim 1, wherein the selecting of the at least one neighboring wireless access point from the candidate list to form the neighbor list further comprises selecting based on reporting received from a plurality of user devices in communication with the neighboring wireless access point.

29. A wireless access point comprising:
means for determining a candidate list, the candidate list including a plurality of neighboring wireless access points, wherein each of the plurality of neighboring wireless access points has at least one characteristic by which that particular neighboring wireless access point can be selected; and
means for selecting at least one neighboring wireless access point from the candidate list to form a neighbor list based on a measure of a frequency of handoffs to the at least one neighboring wireless access point, the neighbor list including a subset of the plurality of neighboring wireless access points included in the candidate list.

30. The wireless access point of claim 29, wherein said means for determining the candidate list comprises at least one of means for reading and means for receiving the candidate list from a computer readable memory.

31. The wireless access point of claim 29, wherein said means for determining the candidate list comprises at least one of means for requesting and means for receiving the candidate list from a management node.

32. The wireless access point of claim 29, wherein means for determining the candidate list comprises at least one of means for requesting and means for receiving the candidate list from a network.

33. The wireless access point of claim 29, wherein said determining the candidate list comprises at least one of means for requesting and means for receiving the candidate list from a radio network controller.

34. The wireless access point of claim 29, wherein the determining the candidate list comprises at least one of requesting and receiving at least one neighboring wireless access point identifier from an access terminal.

35. The wireless access point of claim 29, wherein the plurality of neighboring wireless access points includes at least one of base stations providing macro cells and femto node providing cells smaller than macro cells.

36. The wireless access point of claim 29, wherein the plurality of neighboring wireless access points includes at least one of wireless access points providing adjacent cells to one another and wireless access points providing overlapping cells in combination with other wireless access points.

37. The wireless access point of claim 29, further comprising means for sensing a trigger that initiates forming a list of neighboring wireless access points.

38. The wireless access point of claim 37, wherein the trigger includes at least one of a measure of the time elapsed since a previous neighbor list was formed, a received request from a user device for a new neighbor list, and a measurement based on the motion of a user device.

39. The wireless access point of claim 29, further comprising:
means for transmitting the neighbor list to at least one user device;
means for determining whether or not the at least one user device has accepted the transmitted neighbor list; and
means for forming a new neighbor list when it is determined that the at least one user device has not accepted the transmitted neighbor list.

40. The wireless access point of claim 39, wherein said means for forming the new neighbor list comprises:
means for deleting the wireless access points in a previously formed neighbor list from the candidate list to produce an updated candidate list;
means for selecting wireless access points from the updated candidate list to form the new neighbor list.

41. The wireless access point of claim 40, further comprising means for iteratively forming new neighbor lists until it is determined that the at least one user device has accepted a neighbor list.

42. The wireless access point of claim 39, wherein said means for forming the new neighbor list comprises means for selecting at least one wireless access point for the new neighbor list that was not included in a previously formed neighbor list.

43. The wireless access point of claim 29, wherein the at least one characteristic includes at least one of a measure of the position of a wireless access point in the candidate list, a measure of the type of cell provided by the wireless access point, a measure of the size of the cell provided by the wireless access point, a measure of the frequency of handoffs to a particular wireless access point, an estimate of the probability that a wireless access point is available as a neighbor, an estimate of the relative importance of a wireless access point, and a measure of the relative geographic position of a wireless access point.

44. The wireless access point of claim 29, wherein wireless access points are selected for the neighbor list based on at least one of a measure of the speed of a user device, a measure of the trajectory of a user device, a measure of the present location of a user device, an indicator identifying an antenna or antenna group currently being used to service a user device, an indicator of proximity of the user device to one or more wireless access points, and reporting by a user device.

45. The wireless access point of claim 29, further comprising means for selecting wireless access points for the neighbor list comprising:
means for selecting a first sub-list of preferred wireless access points from the candidate list; and
means for selecting at least a second sub-list of wireless access points to complete the neighbor list.

46. The wireless access point of claim 45, wherein the first sub-list includes wireless access points selected based on at least one of a measure of the position of a wireless access point in the candidate list, a measure of the type of cell provided by the wireless access point, a measure of the size of the cell provided by the wireless access point, a measure of the frequency of handoffs to a wireless access point, a measure of the probability that a wireless access point is available as a neighbor, a measure of the relative importance of a wireless access point, and a measure of the relative geographic position of a wireless access point.

47. The wireless access point of claim 29, further comprising:
means for transmitting the neighbor list to at least one user device;
means for estimating whether or not the at least one user device has had an opportunity to accept the transmitted neighbor list; and
means for forming a new neighbor list when it is estimated that the at least one user device has not accepted the transmitted neighbor list.

48. A wireless access point comprising:
a controller configured to execute code; and
non-transitory computer readable memory storing code that when executed by the controller is configured to:
determine a candidate list, the candidate list including a plurality of neighboring wireless access points, wherein each of the plurality of neighboring wireless access points has at least one characteristic by which that particular neighboring wireless access point can be selected; and
select at least one neighboring wireless access point from the candidate list to form a neighbor list based on a measure of a frequency of handoffs to the at least one neighboring wireless access point, the neighbor list including a subset of the plurality of neighboring wireless access points included in the candidate list.

49. The wireless access point of claim 48, wherein determining the candidate list comprises at least one of reading and receiving the candidate list from a computer readable memory.

50. The wireless access point of claim 48, wherein determining the candidate list comprises at least one of requesting and receiving the candidate list from a management node.

51. The wireless access point of claim 48, wherein determining the candidate list comprises at least one of requesting and receiving the candidate list from a network.

52. The wireless access point of claim 48, wherein determining the candidate list comprises at least one of requesting and receiving the candidate list from a radio network controller.

53. The wireless access point of claim 48, wherein the determining the candidate list comprises at least one of requesting and receiving at least one neighboring wireless access point identifier from an access terminal.

54. The wireless access point of claim 48, wherein the plurality of neighboring wireless access points includes at least one of base stations providing macro cells and femto node providing cells smaller than macro cells.

55. The wireless access point of claim 48, wherein the plurality of neighboring wireless access points includes at least one of wireless access points providing adjacent cells to one another and wireless access points providing overlapping cells in combination with other wireless access points.

56. The wireless access point of claim 48, wherein non-transitory computer readable memory further storing code that when executed by the controller is configured to sense a trigger that initiates forming a list of neighboring wireless access points.

57. The wireless access point of claim 56, wherein the trigger includes at least one of a measure of the time elapsed since a previous neighbor list was formed, a received request from a user device for a new neighbor list, and a measurement based on the motion of a user device.

58. The wireless access point of claim 48, further comprising:
 a transmitter configured to transmit the neighbor list to at least one user device; and
 wherein non-transitory computer readable memory further storing code that when executed by the controller is configured to:
 determine whether or not the at least one user device has accepted the transmitted neighbor list; and
 form a new neighbor list when it is determined that the at least one user device has not accepted the transmitted neighbor list.

59. The wireless access point of claim 58, wherein non-transitory computer readable memory further storing code that when executed by the controller is configured to:
 delete the wireless access points in a previously formed neighbor list from the candidate list to produce an updated candidate list; and
 select wireless access points from the updated candidate list to form the new neighbor list.

60. The wireless access point of claim 59, wherein non-transitory computer readable memory further storing code that when executed by the controller is configured to iteratively form new neighbor lists until it is determined that the at least one user device has accepted a neighbor list.

61. The wireless access point of claim 58, wherein forming the new neighbor list comprises selecting at least one wireless access point for the new neighbor list that was not included in a previously formed neighbor list.

62. The wireless access point of claim 58, wherein determining that the at least one user device has not accepted the transmitted neighbor list includes at least one of receiving a report that the at least one user device has not accepted the transmitted neighbor list.

63. The wireless access point of claim 58, wherein determining that the at least one user device has accepted the transmitted neighbor list includes at least one of not receiving an indication to the contrary for a duration after the neighbor list is transmitted, receiving a request to handover service to the at least one user device to a neighboring wireless access point, receiving a report indicating that the at least one user device has accepted the transmitted neighbor list.

64. The wireless access point of claim 48, wherein the at least one characteristic includes at least one of a measure of the position of a wireless access point in the candidate list, a measure of the type of cell provided by the wireless access point, a measure of the size of the cell provided by the wireless access point, a measure of the frequency of handoffs to a particular wireless access point, an estimate of the probability that a wireless access point is available as a neighbor, an estimate of the relative importance of a wireless access point, and a measure of the relative geographic position of a wireless access point.

65. The wireless access point of claim 48, wherein wireless access points are selected for the neighbor list based on at least one of a measure of the speed of a user device, a measure of the trajectory of a user device, a measure of the present location of a user device, an indicator identifying an antenna or antenna group currently being used to service a user device, an indicator of proximity of the user device to one or more wireless access points, and reporting by a user device.

66. The wireless access point of claim 48, wherein non-transitory computer readable memory further storing code that when executed by the controller is configured to:
 select a first sub-list of preferred wireless access points from the candidate list; and
 select at least a second sub-list of wireless access points to complete the neighbor list.

67. The wireless access point of claim 66, wherein the first sub-list includes wireless access points selected based on at least one of a measure of the position of a wireless access point in the candidate list, a measure of the type of cell provided by the wireless access point, a measure of the size of the cell provided by the wireless access point, a measure of the frequency of handoffs to a wireless access point, a measure of the probability that a wireless access point is available as a neighbor, a measure of the relative importance of a wireless access point, and a measure of the relative geographic position of a wireless access point.

68. The wireless access point of claim 48 wherein non-transitory computer readable memory further storing code that when executed by the controller is configured to:
 transmit the neighbor list to at least one user device;
 estimate whether or not the at least one user device has had an opportunity to accept the transmitted neighbor list; and
 form a new neighbor list when it is estimated that the at least one user device has not accepted the transmitted neighbor list.

69. A system comprising:
 a controller configured to execute code; and
 non-transitory computer readable memory storing code that when executed by the controller is configured to:
 determine a candidate list, the candidate list including a plurality of neighboring wireless access points, wherein each of the plurality of neighboring wireless access points has at least one characteristic by which that particular neighboring wireless access point can be selected; and
 select at least one neighboring wireless access point from the candidate list to form a neighbor list based on a measure of a frequency of handoffs to the at least one neighboring wireless access point, the neighbor list including a subset of the plurality of neighboring wireless access points included in the candidate list.

70. The system of claim 69, wherein determining the candidate list comprises at least one of reading and receiving the candidate list from a computer readable memory.

71. The system of claim 69, wherein determining the candidate list comprises at least one of requesting and receiving the candidate list from a management node.

72. The system of claim 69, wherein determining the candidate list comprises at least one of requesting and receiving the candidate list from a network.

73. The system of claim 69, wherein determining the candidate list comprises at least one of requesting and receiving the candidate list from a radio network controller.

74. The system of claim 69, wherein the determining the candidate list comprises at least one of requesting and receiving at least one neighboring wireless access point identifier from an access terminal.

75. The system of claim 69, wherein the plurality of neighboring wireless access points includes at least one of base stations providing macro cells and femto node providing cells smaller than macro cells.

76. The system of claim 69, wherein the plurality of neighboring wireless access points includes at least one of wireless access points providing adjacent cells to one another and wireless access points providing overlapping cells in combination with other wireless access points.

77. The system of claim 69, wherein non-transitory computer readable memory further storing code that when executed by the controller is configured to sense a trigger that initiates forming a list of neighboring wireless access points.

78. The system of claim 77, wherein the trigger includes at least one of a measure of the time elapsed since a previous neighbor list was formed, a received request from a user device for a new neighbor list, and a measurement based on the motion of a user device.

79. The system of claim 69, further comprising:
a transmitter configured to transmit the neighbor list to at least one user device; and
wherein non-transitory computer readable memory further storing code that when executed by the controller is configured to:
determine whether or not the at least one user device has accepted the transmitted neighbor list; and
form a new neighbor list when it is determined that the at least one user device has not accepted the transmitted neighbor list.

80. The system of claim 79, wherein non-transitory computer readable memory further storing code that when executed by the controller is configured to:
delete the wireless access points in a previously formed neighbor list from the candidate list to produce an updated candidate list; and
select wireless access points from the updated candidate list to form the new neighbor list.

81. The system of claim 80, wherein non-transitory computer readable memory further storing code that when executed by the controller is configured to iteratively form new neighbor lists until it is determined that the at least one user device has accepted a neighbor list.

82. The system of claim 79, wherein forming the new neighbor list comprises selecting at least one wireless access point for the new neighbor list that was not included in a previously formed neighbor list.

83. The system of claim 79, wherein determining that the at least one user device has not accepted the transmitted neighbor list includes at least one of receiving a report that the at least one user device has not accepted the transmitted neighbor list.

84. The system of claim 79, wherein determining that the at least one user device has accepted the transmitted neighbor list includes at least one of not receiving an indication to the contrary for a duration after the neighbor list is transmitted, receiving a request to handover service to the at least one user device to a neighboring wireless access point, receiving a report indicating that the at least one user device has accepted the transmitted neighbor list.

85. The system of claim 69, wherein the at least one characteristic includes at least one of a measure of the position of a wireless access point in the candidate list, a measure of the type of cell provided by the wireless access point, a measure of the size of the cell provided by the wireless access point, a measure of the frequency of handoffs to a particular wireless access point, an estimate of the probability that a wireless access point is available as a neighbor, an estimate of the relative importance of a wireless access point, and a measure of the relative geographic position of a wireless access point.

86. The system of claim 69, wherein wireless access points are selected for the neighbor list based on at least one of a measure of the speed of a user device, a measure of the trajectory of a user device, a measure of the present location of a user device, an indicator identifying an antenna or antenna group currently being used to service a user device, an indicator of proximity of the user device to one or more wireless access points, and reporting by a user device.

87. The system of claim 69, wherein non-transitory computer readable memory further storing code that when executed by the controller is configured to:
select a first sub-list of preferred wireless access points from the candidate list; and
select at least a second sub-list of wireless access points to complete the neighbor list.

88. The system of claim 87, wherein the first sub-list includes wireless access points selected based on at least one of a measure of the position of a wireless access point in the candidate list, a measure of the type of cell provided by the wireless access point, a measure of the size of the cell provided by the wireless access point, a measure of the frequency of handoffs to a wireless access point, a measure of the probability that a wireless access point is available as a neighbor, a measure of the relative importance of a wireless access point, and a measure of the relative geographic position of a wireless access point.

89. The system of claim 69 wherein non-transitory computer readable memory further storing code that when executed by the controller is configured to: transmit the neighbor list to at least one user device;
estimate whether or not the at least one user device has had an opportunity to accept the transmitted neighbor list; and
form a new neighbor list when it is estimated that the at least one user device has not accepted the transmitted neighbor list.

* * * * *